(12) United States Patent
Canzano et al.

(10) Patent No.: US 8,323,496 B2
(45) Date of Patent: Dec. 4, 2012

(54) METHODS FOR TREATMENT OF PERCHLORATE CONTAMINATED WATER

(75) Inventors: Ken Canzano, Cherry Hill, NJ (US); Michael A. Del Vecchio, Flemington, NJ (US); Samuel Frisch, Manalapan, NJ (US); Douglas Watt, Hamilton Square, NJ (US); Robert Loudon, Lebanon, OH (US); Todd Webster, San Diego, CA (US)

(73) Assignee: Envirogen Technologies, Inc., Kingwood, TX (US)

( * ) Notice: Subject to any disclaimer, the term of this patent is extended or adjusted under 35 U.S.C. 154(b) by 406 days.

(21) Appl. No.: 12/577,454

(22) Filed: Oct. 12, 2009

(65) Prior Publication Data

US 2010/0089825 A1 Apr. 15, 2010

Related U.S. Application Data

(60) Provisional application No. 61/104,900, filed on Oct. 13, 2008.

(51) Int. Cl.
*C02F 3/00* (2006.01)

(52) U.S. Cl. .......................................... 210/610

(58) Field of Classification Search ........... 210/610–611
See application file for complete search history.

(56) References Cited

U.S. PATENT DOCUMENTS 6,077,429 A * 6/2000 Frankenberger et al. ..... 210/605

OTHER PUBLICATIONS

Todd S. Webster et al., Poster: Treatment of Perchlorate at Low Concentrations in Groundwater to Drinking Water Quality Standards Using a Fluidized Bed Bioreactor Treatment System, Shaw Environmental & Infrastructure, Inc., 1 page, Dec. 2006.

* cited by examiner

*Primary Examiner* — Chester Barry
(74) *Attorney, Agent, or Firm* — RatnerPrestia

(57) ABSTRACT

The invention provides systems and methods for removing perchlorate from water. The systems comprise reactors comprising biomass for degrading perchlorate, and the operation of the systems can be controlled according to novel logic specifications. Also provided are filters and filtration systems for clearing water in advance of analysis of the concentration of contaminants within the water. The filters comprise a length of tubing configured to generate backpressure at the filter sufficient to facilitate the flow of a water sample through the filter without overpressurization.

6 Claims, 16 Drawing Sheets

METHODS FOR TREATMENT OF PERCHLORATE CONTAMINATED WATER

CROSS REFERENCE TO RELATED APPLICATIONS

This application claims benefit of U.S. Provisional Application No. 61/104,900, filed Oct. 13, 2008, the contents of which are incorporated by reference herein, in their entirety and for all purposes.

FIELD

The invention relates generally to the field of water purification. More specifically, the invention relates to the purification of perchlorate contaminated ground water to produce potable water.

BACKGROUND

Perchlorate contamination has been found in the drinking water and ground water in at least 25 states. Although perchlorate occurs naturally, its use in flares, fireworks, pyrotechnics, explosives, missile and rocket propulsion systems has been attributed to its rise in incidence and in concentration in ground water and drinking water supplies.

Perchlorate is believed to affect the health of both humans and animals. In humans, it interferes with iodide uptake by the thyroid gland, which plays a role in metabolism via thyroid hormones, and in the physical development of children. Concern is mounting that ingestion of harmful levels of perchlorate may induce or aggravate thyroid dysfunction, and may negatively impact neurological development. The full scope of negative health effects of perchlorate exposure have not yet been elucidated.

In the United States, the Environmental Protection Agency (EPA) is considering standards for safe levels of perchlorate concentration in drinking water, for example. The EPA has established a concentration of 24.5 µg/L as the recommended drinking water equivalent level (DWEL) for perchlorate of, and has recommended cleanup of concentrations in excess of this level.

Various technologies have been proposed for perchlorate removal. Nevertheless, there remains a need for improved perchlorate removal systems, including systems that can reduce or eliminate the use of excess chemicals and/or the need for intensive operator sampling regimens. The present invention addresses these and other long felt needs.

SUMMARY

The invention features systems and methods for reducing the concentration of perchlorate in water. In some aspects, the invention provides systems comprising a reactor comprising biomass capable of degrading perchlorate, an electron donor source positioned to deliver an electron donor to the reactor, a nutrient source position to deliver nutrients to the reactor at least one analyzer configured to measure the concentration of nitrogen-containing compounds in the feed water, at least one analyzer configured to measure the concentration of perchlorate in the feed water and in the treated water and a programmable logic controller configured to control the flow of water through the system and the delivery of the electron donor and nutrients into the reactor in response to the concentration of perchlorate measured in the feed water and in the treated water and the concentration of nitrogen-containing compounds measured in the feed water. Optionally, the system can comprise at least one analyzer configured to measure the concentration of nitrogen in the treated water, and/or at least one analyzer configured to measure the concentration of oxygen in the feed water.

In some preferred aspects, the reactor is a fluidized bed reactor. In some preferred aspects, the analyzer configured to measure the concentration of perchlorate is a chromatograph. The system can comprise a human machine interface to enable a human to operate the system. The system can comprise one or more filters.

The analyzer to measure the concentration of nitrogen-containing compounds in the feed water can be configured to receive manual input of the concentration of nitrogen containing compounds in the feed water. The analyzer to measure the concentration of oxygen in the treated water can be configured to receive manual input of the concentration of oxygen in the treated water.

Also featured are methods for reducing the concentration of perchlorate in water. In some aspects, the methods comprise measuring the concentration of perchlorate and nitrogen containing compounds in water, contacting the water with biomass capable of degrading perchlorate in a reactor for a period of time sufficient to reduce the concentration of perchlorate in the water, adding electron donor or nutrients to the water in the reactor in an amount effective to facilitate the degradation of perchlorate in the water by the biomass, measuring the concentration of perchlorate or nitrogen containing compounds in the treated water and, repeating the method steps until the concentration of perchlorate in the treated water is reduced to an acceptable concentration such as below a minimum control limit. Optionally, the method can further comprise removing excess electron donor or excess nutrients from the treated water. The electron donor can be ethanol or acetic acid.

In some aspects, the methods comprise contacting water with biomass capable of degrading perchlorate in a reactor, adding electron donor or nutrients to the water in the reactor in an amount effective to facilitate the degradation of perchlorate in the water by the biomass, determining the concentration of perchlorate or nitrogen in the treated water, and disabling the flow of water through the reactor if the concentration of perchlorate is at or higher than a minimum control limit for perchlorate but lower than a maximum control limit for perchlorate, or if the concentration of nitrogen is at or higher than a minimum control limit for nitrogen but lower than a maximum control limit for nitrogen, and enabling the flow of water through the reactor if the concentration of perchlorate is lower than the minimum control limit for perchlorate or if the concentration of nitrogen is lower than the minimum control limit for nitrogen. Disabling the flow of water can further comprise adding electron donor or nutrients to the water in the reactor in an amount effective to facilitate the degradation of perchlorate in the water by the biomass, or increasing the time the treated water is in contact with the biomass in the reactor, re-determining the concentration of perchlorate or nitrogen in the treated water, and repeating these steps until the concentration of perchlorate is lower than the minimum control limit for perchlorate or until the concentration of nitrogen is lower than the minimum control limit for nitrogen. Once the perchlorate or nitrogen is lower than their respective minimum control limit the flow of water through the reactor can be enabled.

In some aspects, the methods comprise contacting water with biomass capable of degrading perchlorate in a reactor, adding electron donor or nutrients to the water in the reactor in an amount effective to facilitate the degradation of perchlorate in the water by the biomass, determining the concentration of perchlorate or nitrogen in the treated water, adding a predetermined maximum concentration of electron donor to the water in the reactor if the concentration of nitrogen is higher than a maximum control limit for nitrogen or if the concentration of perchlorate is higher than a maximum control limit for perchlorate, re-determining the concentration of perchlorate or nitrogen in the treated water, and repeating these steps if the concentration of nitrogen is higher than the maximum control limit for nitrogen or if the concentration of perchlorate is higher than the maximum control limit for perchlorate. If the concentration of nitrogen is higher than the minimum control limit for nitrogen but lower than the maximum control limit for nitrogen or if the concentration of perchlorate is higher than the minimum control limit for perchlorate but lower than the maximum control limit for perchlorate the flow of water through the reactor can be disabled, and enabled or re-enabled if the concentration of nitrogen is lower than the minimum control limit for nitrogen or if the concentration of perchlorate is lower than the minimum control limit for perchlorate.

Disabling the flow of water can comprise adding electron donor or nutrients to the water in the reactor in an amount effective to facilitate the degradation of perchlorate in the water by the biomass, determining the concentration of nitrogen or perchlorate in the treated water, and repeating these steps until the concentration of nitrogen is lower than the minimum control limit for nitrogen, and enabling the flow of water through the reactor if the concentration of nitrogen is lower than the minimum control limit.

The invention also features systems for facilitating water flow through a filter. The systems can comprise a filter comprising at least one inlet configured to receive water, at least one forward stream outlet configured to allow filtered water to exit the filter, and at least one return stream outlet configured to allow unfiltered water to exit the filter, and a length of tubing reversibly connected to the return stream outlet, wherein the tubing generates sufficient backpressure to facilitate the flow of water through the filter without overpressurizing the filter. The filter pore size can be about 0.2 μm. The tubing can be configured in a coil. The system can further comprise an analyzer reversibly connected to the at least one forward stream outlet.

DETAILED DESCRIPTION

It is to be understood that this invention is not limited to particular methods, reagents, compounds, or compositions. It is also to be understood that the terminology used herein is for the purpose of describing particular aspects only, and is not intended to be limiting.

Various terms relating to the methods and other aspects of the present invention are used throughout the specification and claims. Such terms are to be given their ordinary meaning in the art unless otherwise indicated. Other specifically defined terms are to be construed in a manner consistent with the definition provided herein.

Perchlorate removal optionally includes carbon adsorption, reverse osmosis, and/or biological treatment. Biological degradation of perchlorate is favored as the most effective and economical means for removing perchlorate contamination from water. Several strains of microorganisms have been isolated and characterized as having the ability to degrade perchlorate into chloride ions and water. The use of fluid bed reactors (FBR) is one preferred technique for producing potable water with an acceptable perchlorate concentration.

FBR technology optionally utilizes a fixed proportional chemical dosing regime, based on a stoichiometric relationship with a safety factor to ensure complete degradation of perchlorate. In some circumstances, however, this approach may cause the use of excess chemicals along with the expense associated with such excess, residual chemical in treated water, and the necessity for intensive operator sampling regimens to ensure perchlorate degradation is achieved. It is therefore preferred to minimize the need for chemical excess, and to reduce operator involvement in favor of an automated approach.

Automation of perchlorate treatment systems has been difficult to achieve. For example, the turn-around time from sample collection to receiving the analytical results of perchlorate and nitrate concentration in water samples has prevented the use of perchlorate concentration data in process control systems. It has been discovered in accordance with exemplary embodiments of the present invention that chemical addition and monitoring can be optimized to ensure complete and economical degradation of perchlorate from contaminated water. It has further been discovered that this optimization can be automated according to particular logic specifications. Accordingly, the invention provides systems and methods for removing perchlorate from water.

In one aspect, the invention features systems for removing perchlorate from water. The drawings illustrate non-limiting representative embodiments of the perchlorate removal systems of the invention.

Figure 1:
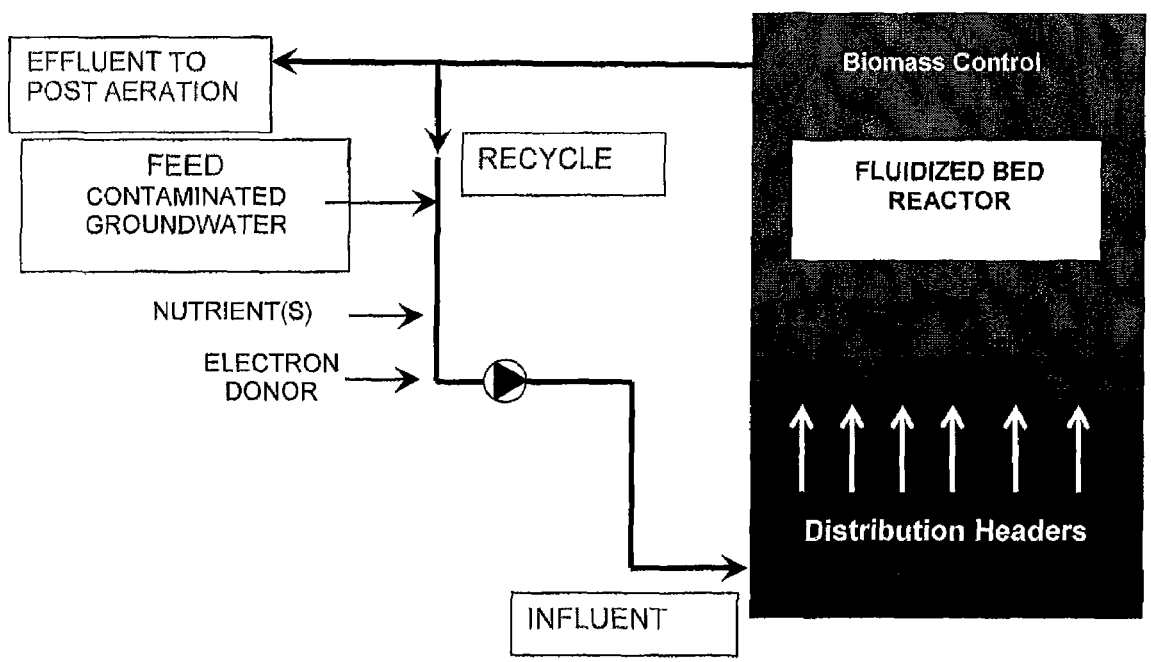
FIG. 1 shows a typical process flow diagram for a fluidized bed reactor system.

An overview of a fluidized bed reactor perchlorate degradation system is shown in FIG. 1. Perchlorate-contaminated water enters a FBR comprising biomass. Nutrients and electron donors are added to the FBR to facilitate degradation of the perchlorate by the biomass. Following decontamination, the water is released from the FBR. If the treated water contains unacceptable levels of residual perchlorate, the water can be recycled through the FBR for further treatment. If the levels of perchlorate are acceptable, the treated water can undergo further processing, including clarification and purification to achieve drinking water quality.

Figure 3:
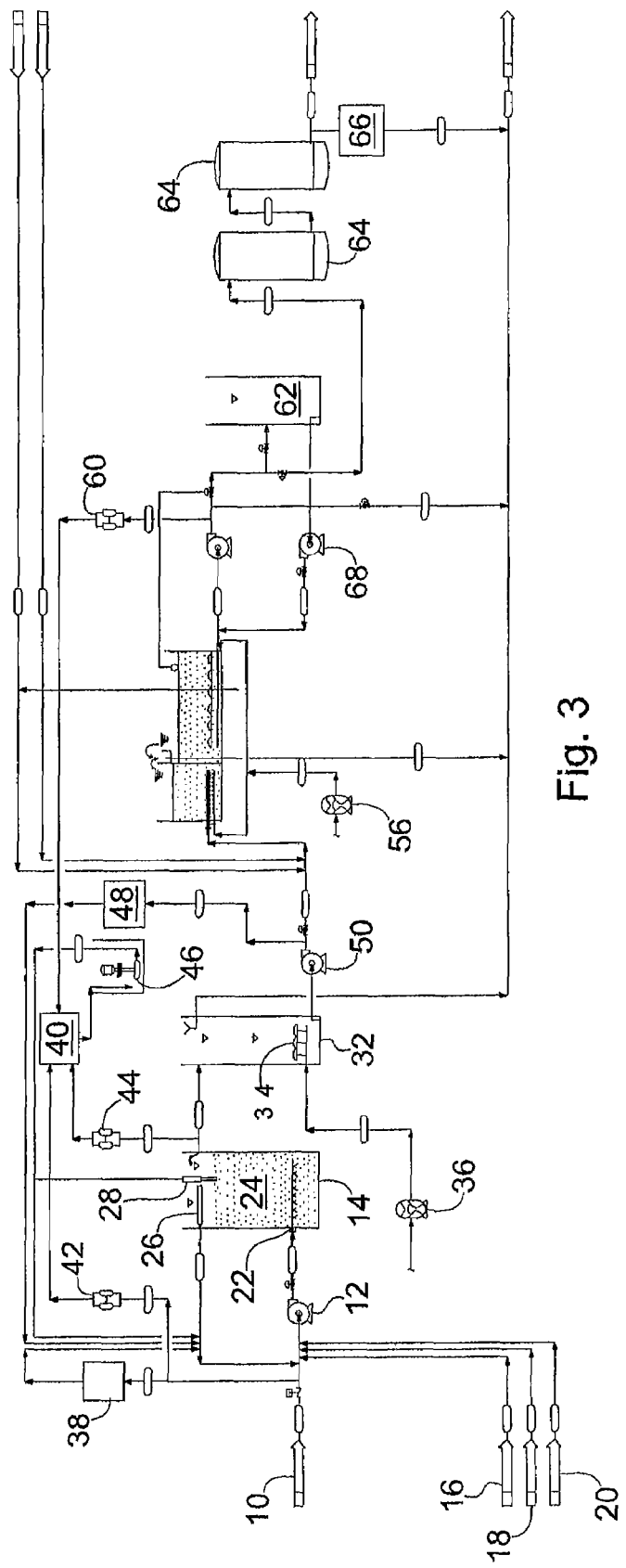
FIG. 3 shows an example of a configuration of a perchlorate treatment system. A fluidized bed reactor system is shown configured with analyzers for nitrate and perchlorate concentration in the water. Treated water can be further processed to attain potable, drinkable grade water using filters, carbon, and ultraviolet light purification constituents.

A detailed embodiment of an exemplary FBR perchlorate treatment system is shown in FIG. 3. As shown in FIG. 3, perchlorate-contaminated water from a water source 10 such as ground water or surface water can be brought in contact with a reactor such as a fluidized bed reactor 14 configured to degrade perchlorate. Suspended growth reactors, fixed film reactors, or packed bed reactors could also be used to degrade perchlorate. Water can enter the fluidized bed reactor through an inlet 22 via gravity, or preferably via a pump 12. Water entering the fluidized bed reactor is synonymously referred to herein as feed water. Feed water can include any proportion of effluent from the FBR, which is synonymously referred to herein as treated water. The flow rate of the feed water can vary, and those of skill in the art would be expected to be able to optimize the flow rate according to the particular configuration of the perchlorate treatment system. For example, the flow rate of the feed water can range from about 1 to about 100 gallons per minute (gpm) per square foot (sq.ft.), more preferably from about 5 to about 50 gpm/sq.ft, and even more preferably from about 10 to about 12 gpm/sq.ft.

Samples of feed water can be taken prior to the water entering the reactor and analyzed to measure the pH, the concentration of nitrogen-containing compounds such as nitrate or nitrite, the concentration of dissolved oxygen, and/or the concentration of perchlorate in the water. The samples can be filtered, for example, through a filter having a pore size of about 0.2 microns, prior to the analysis. It is highly preferable that the sampling be automated.

Measurements can be obtained by any means suitable in the art, for example, by means of one or more analyzers configured to measure one or more of such constituents of the feed water. The one or more analyzers can be dedicated to measuring one particular constituent, such as a nitrogen analyzer 38 or a perchlorate analyzer 40. In some aspects, a single analyzer can be configured to measure multiple constituents, including nitrogen and perchlorate. Samples can be directed to the analyzer by means of a pump, for example a pneumatic diaphragm pump 42. After sampling, any residual water can be redirected into the reactor as feed water.

Any analyzer suitable in the art for measuring nitrogen or perchlorate can be used. In some preferred aspects, the analyzer is a chromatograph. One example of a suitable analyzer is a Dionex Ion Chromatography Analyzer.

Feed water can be contacted with biomass 24 to degrade the perchlorate. The biomass can comprise media and at least one type of microorganism capable of metabolizing (degrading) perchlorate. The type of media chosen is not critical and can vary according to the needs of the particular municipality or entity desiring to purify perchlorate-contaminated water, and various media are commercially available. Media having an average pore size of about 0.9 to about 1.1 mm in diameter are preferred, although larger or smaller pore sizes can be utilized. The media can be free-floating in the reactor, or can be affixed to one or more substrata within the reactor chamber. The media can be directly inoculated with commercially prepared microorganisms, or can be inoculated with microorganisms naturally present in the feed water. Microorganisms that are capable of metabolizing perchlorate are known in the art (Coates et al. (2004) Nature Rev. Microbiol. 2:569-80; Zhang et al. (2002) Environmental Microbiol. 4:570-6; Wu et al. (2001) Bioremediation J. 5:119-30; and, Coates et al. (1999) Applied Environmental Microbiol. 65:5234-41).

The time required to degrade the perchlorate can vary, for example, according to the concentration of perchlorate in the water, the amount of biomass in the reactor, and the like. Preferably, the water is contacted with the biomass for a time sufficient to allow degradation of the perchlorate to acceptable levels.

The reactor can have a pH control 16 to adjust pH of the feed water to an acceptable level. It is preferred that the pH of the feed water is between about 6 and about 8, although a higher or lower pH can be used. Neutral pH, about 7, is highly preferred. Any reagent suitable in the art for increasing or decreasing pH can be used to adjust the pH level.

The reactor can also have an electron donor source 18. The electron donor can be a carbon source for the microorganisms to metabolize. Non-limiting examples of suitable electron donors include alcohols such as methanol and ethanol, as well as sodium acetate, citric acid, acetic acid, or combinations thereof. In some aspects, acetic acid is the preferred electron donor. In some aspects, ethanol is a preferred electron donor.

The reactor can comprise a nutrient source 20. The nutrient source can be a nitrogen containing compound, including any nitrogen containing compounds present in the feed water, a phosphorous containing compound, a sulfur containing compound, a metal, or combinations thereof. Non-limiting examples of nitrogen containing compounds include nitrate, nitrite, urea, and ammonium phosphate. Non-limiting examples of phosphate containing compounds include phosphoric acid and sodium phosphate. Non-limiting examples of sulfur and metal containing compounds include ferrous sulfate, manganese sulfate, and sodium molybdate.

As will be understood by those of skill in the art, the constant source of metabolites may facilitate an overgrowth of the biomass. It is thus preferable to control the growth and size of the biomass. Accordingly, the reactor can comprise a biomass separator 28. The biomass separator can generate turbulence in the reactor to remove excess biomass and control the growth of microorganisms.

Treated water can exit the reactor via an outlet 30 or a collector 26. A plug-flow system prevents back-mixing of treated water with feed water in the system undergoing perchlorate degradation. The collector diverts treated water back into the reactor for further treatment. Treated water recycled back into the reactor is synonymously referred to herein as recycled water. Recycled water can re-enter the reactor via a fluidization pump, and can be mixed with any amount of feed water. Any amount of treated water, for example 0%-100%, can be recycled, depending on the needs of the system's operator, for example, a need to optimize flow rate for water entering the reactor, or a need to further reduce the concentration of perchlorate in the treated water.

Samples of treated water can be taken to measure the concentration of nitrogen-containing compounds and/or the concentration of perchlorate in the treated water. It is highly preferred that the sampling by automated. Measurements can be obtained by any means suitable in the art, for example, by means of one or more analyzers configured to measure one or more of such constituents of the treated water. The one or more analyzers can be dedicated to measuring one particular constituent, such as a nitrogen analyzer 48 or a perchlorate analyzer 40. In some aspects, a single analyzer can be configured to measure multiple constituents. Treated water samples can be directed to the perchlorate analyzer 40 by means of a pump such as a pneumatic diaphragm pump 44. After sampling, any residual water can be redirected into the reactor as recycled water. This recycled water can be directed to the reactor by means of a pump such as a motorized submersible pump 46.

In some aspects, FBR treated water is anoxic, and therefore may need to be aerated prior to discharge to meet the drinking water criteria for oxygen demand. Aeration can be implemented after the FBR treatment step, or after filtration. If aeration is before FBR treatment, aeration can occur in a dedicated aeration tank 32. Air can be directed to the aeration tank by means of an aeration air blower 36. The air can be mixed with the treated water using a mixer 34. Aerated treated water can be directed to the nitrogen analyzer or perchlorate analyzer by means of a pump. A pressurized sample stream can be analyzed for its concentration of nitrogen containing compounds and/or perchlorate.

Treated water can be returned to the water source such as the ground water or surface water. More preferred, however, is to further process the treated water to achieve potable, drinking water-quality water. Thus, treated water can be optionally further treated to remove residual contaminants. One embodiment of a system to further process treated water is shown in FIG. 3. Residual contaminants can stem from the original water source, and would therefore be expected to vary depending on the location of the water source being treated by the system. Residual contaminants may also include particulates, media, or microorganisms dislodged from the reactor.

In some aspects, the treated water is processed through a filtration system 52 such as a Trimite or Trident Filter. The filtration system can comprise one or more filters or a filtration media 54. Alternate filtration equipment approved for use in the production of drinking water from surface waters can be substituted. Treated water may be directed to the filtration system through a filter feed pump 50. Optionally, the filtered treated water can be aerated. The air can be supplied by a filter air blower 56. Treated water that has been further processed through the filtration system is synonymously referred to herein as clarified treated water.

Clarified treated water can be analyzed to determine its perchlorate or nitrogen concentration. Thus, for example, samples of clarified treated water can be directed to perchlorate analyzer 40. In some aspects, a pump such as a pneumatic pump 60 can be used to direct the water sample to the perchlorate analyzer. After sampling, any residual water can be redirected into the reactor as feed water.

Particulate matter present in the treated water will be trapped on the filters or within the filtration media. Accordingly, the filters or filtration media may need to be periodically replaced or recharged. To reduce the frequency of such replacements, the filtration system can optionally be periodically washed. In some preferred aspects, clarified treated water can be used as a backwash to dislodge particulate matter from the filters or filtration media. Thus, some clarified treated water can be stored in a filter effluent tank 62. A pump 58 can be used to direct clarified treated water to the filter effluent tank. As needed, the stored water can be used to backwash the filtration system. A filter backwash pump 68 can be used to facilitate backwashing of the filtration system.

Clarified treated water that is not stored in the filter effluent tank can be further processed to remove additional contaminants. Preferably, the clarified treated water can be directed to a granular activated carbon (GAC) system 64. In the GAC system, activated carbon can remove residual chemical contaminants from the water, which adsorb onto the activated carbon. A pump 58 can be used to direct clarified treated water to the GAC system. Subsequent to GAC treatment, the clarified water can optionally be disinfected. Any means suitable in the art for disinfecting water can be used, including chlorination, ionizing radiation, ultraviolet radiation, and the like. In one preferred aspect, the water is disinfected with ultraviolet light from an ultraviolet light source 66. Preferably, the purified, disinfected water is drinking water quality, potable water. The terms drinking water and potable water are used interchangeably herein.

Figure 4:
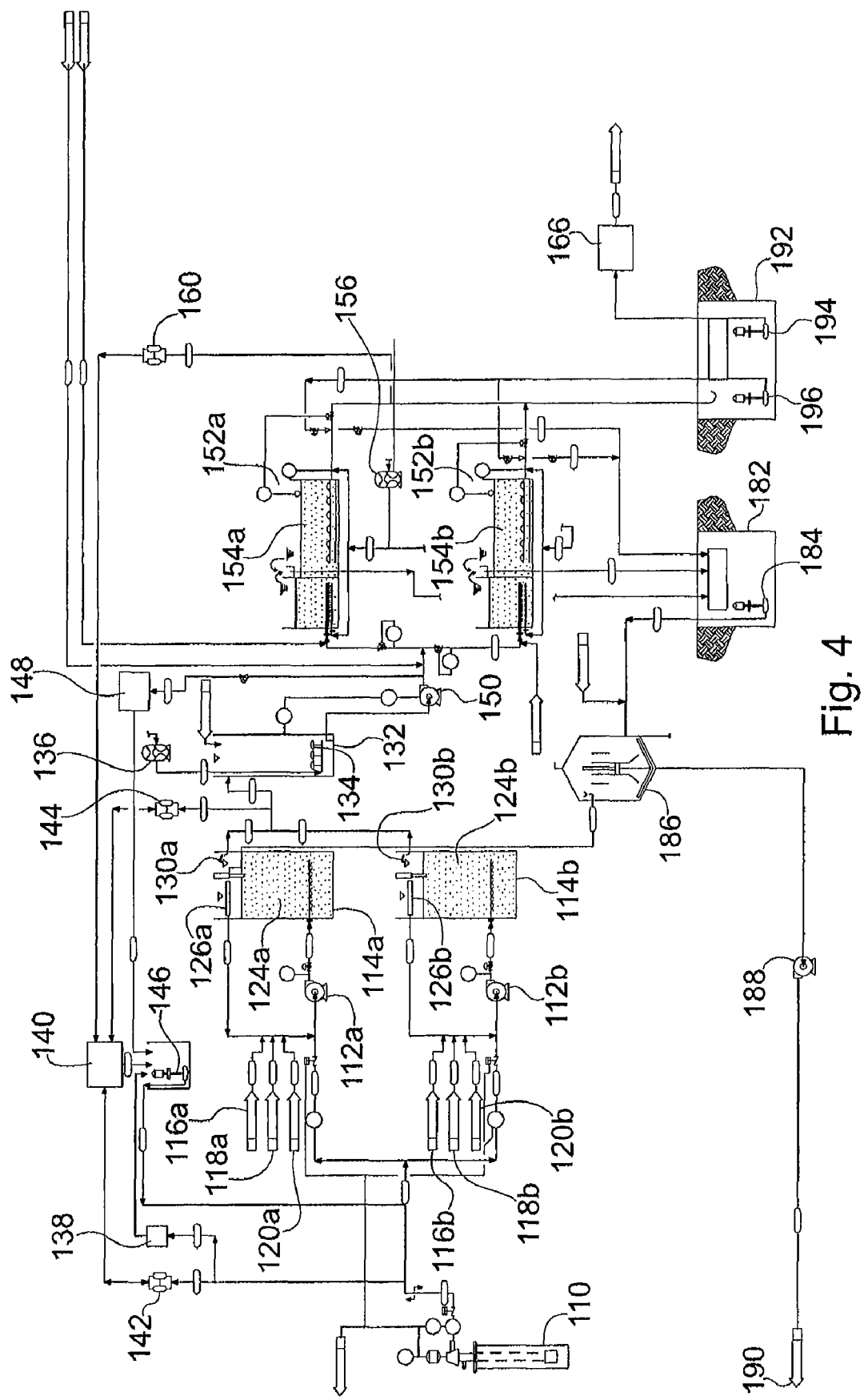
FIG. 4 shows an example of a configuration of a fluidized bed reactor perchlorate treatment system using two fluid bed reactors.

In one preferred embodiment, the system comprises more than one FBR. An example of a two FBR system is shown in FIG. 4. As shown in FIG. 4, perchlorate-contaminated water from a water source 110 such as ground water or surface water can be brought in contact with two reactors 114a and 114b configured to degrade perchlorate. Multiple reactors enhance the volume of water that can be treated, and provide the added advantage of system redundancy such that if one reactor is in need of maintenance, the entire water treatment system should not need to be shut down. It is contemplated that the inventive systems can comprise more than two FBR. The percentage of total water to be treated can, but need not be distributed equally among each FBR.

Feed water can enter the FBR through an inlet 122a or 122b via gravity or via a pump 112a or 112b. Feed water can include treated water. The flow rate of the feed water can vary according to the particular configuration of the perchlorate treatment system. For example, the flow rate of the feed water can range from about 1 to about 100 gallons per minute (gpm) per square foot (sq.ft.), more preferably from about 5 to about 50 gpm/sq.ft, and even more preferably from about 10 to about 12 gpm/sq.ft.

Samples of feed water can be taken prior to the water entering the reactor and analyzed to measure pH, the concentration of nitrogen-containing compounds, the concentration of dissolved oxygen, and/or the concentration of perchlorate. The samples can be filtered, for example, through a filter having a pore size of about 0.2 microns, prior to the analysis. It is highly preferable that the sampling be automated.

Measurements can be obtained by any means suitable in the art, for example, by means of one or more analyzers configured to measure one or more of such constituents of the feed water. The one or more analyzers can be dedicated to measuring one particular constituent, such as a nitrogen analyzer 138 or a perchlorate analyzer 140. In some aspects, a single analyzer can be configured to measure multiple constituents such as nitrogen and perchlorate. The system can include one analyzer or set of analyzers per reactor, or can include one analyzer or set of analyzers to service both reactors. Samples can be directed to the analyzer by means of a pump, for example a pneumatic diaphragm pump 142. After sampling, any residual water can be redirected into the reactor as feed water.

Feed water can be contacted with biomass 124a or 124b to degrade the perchlorate. The biomass can comprise media and at least one type of microorganism capable of metabolizing perchlorate. The type of media chosen is not critical and can vary according to the needs of the particular municipality or entity desiring to purify perchlorate-contaminated water, and various media are commercially available. Media having an average pore size of about 0.9 to about 1.1 mm in diameter are preferred, although larger and smaller pore sizes can also be used. The media can be free-floating in the reactor, or can be affixed to one or more substrata within the reactor chamber. The media can be directly inoculated with commercially prepared microorganisms, or inoculated with microorganisms naturally present in the feed water.

Each reactor can have a pH control 116a or 116b to adjust pH of the feed water to an acceptable level. It is preferred that the pH of the feed water is between about 6 and about 8, although a higher or lower pH can be used. Neutral pH, about 7, is highly preferred. Any reagent suitable in the art for increasing or decreasing pH can be used to adjust the pH level.

Each reactor can also have an electron donor source 118a or 118b. The electron donor can be a carbon source for the microorganisms to metabolize. Non-limiting examples of suitable electron donors include alcohols such as methanol or ethanol, as well as sodium acetate, citric acid, acetic acid, or combinations thereof. In some aspects, acetic acid is the preferred electron donor. In some aspects, ethanol is a preferred electron donor.

Each reactor can comprise a nutrient source 120a or 120b. The nutrient source can be a nitrogen containing compound, including any nitrogen containing compounds present in the feed water, a phosphorous containing compound, a sulfur containing compound, a metal, or combinations thereof. Non-limiting examples of nitrogen containing compounds include nitrate, nitrite, urea, and ammonium phosphate. Non-limiting examples of phosphate containing compounds include phosphoric acid and sodium phosphate. Non-limiting examples of sulfur and metal containing compounds include ferrous sulfate, manganese sulfate, and sodium molybdate.

Each reactor can comprise a biomass separator 128a or 128b, which can generate turbulence in the reactor to remove excess biomass and control the growth of microorganisms.

Treated water can exit each reactor through a collector 126a or 126b. A plug-flow system prevents back-mixing of treated water with feed water in the system undergoing perchlorate degradation. The collector recycles water back into the reactor for further treatment. Recycled water can be pumped into the reactor through pump 112a or 112b, and can be mixed with any amount of feed water.

Samples of treated water from each reactor can be taken to measure the concentration of nitrogen-containing compounds and/or the concentration of perchlorate in the treated water, and such samples can be filtered prior to analysis. It is highly preferred that the sampling by automated. Measurements can be obtained by any means suitable in the art, for example, by means of one or more analyzers configured to measure one or more of such constituents of the treated water. The one or more analyzers can be dedicated to measuring one particular constituent, such as a nitrogen analyzer 148 or a perchlorate analyzer 140. In some aspects, a single analyzer can be configured to measure multiple constituents, and a single analyzer can be used to take measurements from water samples from each reactor. It is possible to have separate analyzers for each reactor.

Treated water samples can be directed to the perchlorate analyzer 140 by means of a pump such as a pneumatic diaphragm pump 144. After sampling, any residual water can be redirected into the reactor as recycled water. This recycled water can be directed to the reactor by means of a pump such as a motorized submersible pump 146.

In some aspects, treated water is aerated prior to the analysis of its concentration of nitrogen containing compounds and/or perchlorate. Aeration can occur in a dedicated aeration tank 132. A single aeration tank can be used for treated water from each reactor, or multiple aeration tanks can be used. Air can be directed to the aeration tank by means of an aeration air blower 136. The air can be mixed with the treated water using a mixer 134. Aerated treated water can be directed to the nitrogen analyzer or perchlorate analyzer by means of a pump.

It is highly preferred to further process the treated water to achieve potable, drinking water-quality water. Thus, treated water can be optionally further treated to remove residual contaminants. One embodiment of a system to further process treated water is shown in FIG. 4. Residual contaminants may be present in the water from the original water source and may also include particulates or microorganisms from one or more reactors.

The treated water can be processed through one or more filtration systems. In one preferred aspect, two filtration systems 152a and 152b are used. The use of two filtration systems provide the advantage of increasing water treatment capacity, and also provide the advantage of redundancy such that one filtration system can remain operational during the maintenance or cleaning of the other filtration system. Each filtration system can comprise one or more filters or a filtration media 154a and 154b. Alternate filtration equipment approved for use in the production of drinking water from surface waters can be substituted. Treated water may be directed to the filtration system through a filter feed pump 150. Each filtration system can have a separate pump, or a single pump may be used to pump water into each filtration system. Optionally, the clarified treated water can be aerated. The air can be supplied by a filter air blower 156a or 156b.

Clarified treated water can be analyzed to determine its perchlorate or nitrogen concentration. Thus, for example, samples of clarified treated water can be directed to perchlorate analyzer 140. In some aspects, a pump such as a pneumatic pump 160 can be used to direct the water sample to the perchlorate analyzer. After sampling, any residual water can be redirected into the reactor as feed water.

To prolong the use of the filters and filtration media, each filtration system can optionally be periodically washed. In some preferred aspects, clarified treated water can be used as a backwash to dislodge particulate matter from the filters or filtration media. Clarified treated water can be stored in a sump 192, which can be underground. To backwash one or more of the filtration systems, the clarified treated water stored in the sump can be pumped backward through the filtration system, for example, by means of a motorized submersible pump 196.

Backwash water, containing particulate matter removed from the filtration system, can be stored in a separate backwash sump 182. From the sump, the backwash water containing particulate matter can be pumped into a solids separator 186, for example, by means of a motorized submersible pump 184. The solids and particulate matter from the water are retained in the solids separator, and the cleared backwash water can be recycled through the water treatment system, including recycled through the reactor, or recycled through the filtration system. The solids can be periodically discharged from the solids separator, and disposed of according to any means appropriate in the art, or as governed by applicable disposal or environmental laws. For example, the solids can be disposed of by means of a truck 190. In some aspects, the solids can be pumped into the disposal truck through a solids transfer pump 188. Any solids separator technology that is approved for use in a drinking water treatment system can be selected for use.

Clarified treated water stored in sump 192 can be further processed to achieve drinking water quality purity. For example, the clarified treated water can optionally be directed to a GAC system. The clarified treated water can then be disinfected according to any means suitable in the art, such as ultraviolet radiation. For example, an ultraviolet light source 166 can be used to irradiate the filtered treated water to remove any residual microbial contaminants present in the water. A pump 194 can be used to direct water to the ultraviolet light source. Preferably, the purified, disinfected water is drinking water quality, potable water.

Measurements of the concentration of perchlorate and/or nitrogen in the water are taken at various points along the water treatment protocol to ensure that perchlorate is being degraded and to facilitate adjustments in the operation of the system to ensure perchlorate is degraded to acceptable levels. Such measurements are provided by one or more analyzers as described and exemplified herein. In general, operation of the analyzers requires that the water samples be free from particulate matter. Accordingly, it is highly preferred that water samples be cleared of particulate matter in advance of analysis.

Clearance of particulate matter can be achieved according to any means suitable in the art, and is preferably achieved by a filter. The filter pore size can vary, for example, according to the specifications of the analyzer. In highly preferred aspects, the filter pore size is about 0.2 µm. The filter can tolerate blockages in the filtrate line while the analyzer is testing other samples from different points in the drinking water treatment process. Any filter or filtration system suitable in the art can be used, and preferably, the filter or filtration system provides continuous filtration. In exemplary aspects, the filter is a Collins Products Filter, Model 9150 Filter, which provides the capability of continuous filtration and is tolerant of intermittent filtrate flow rates.

Figure 5:
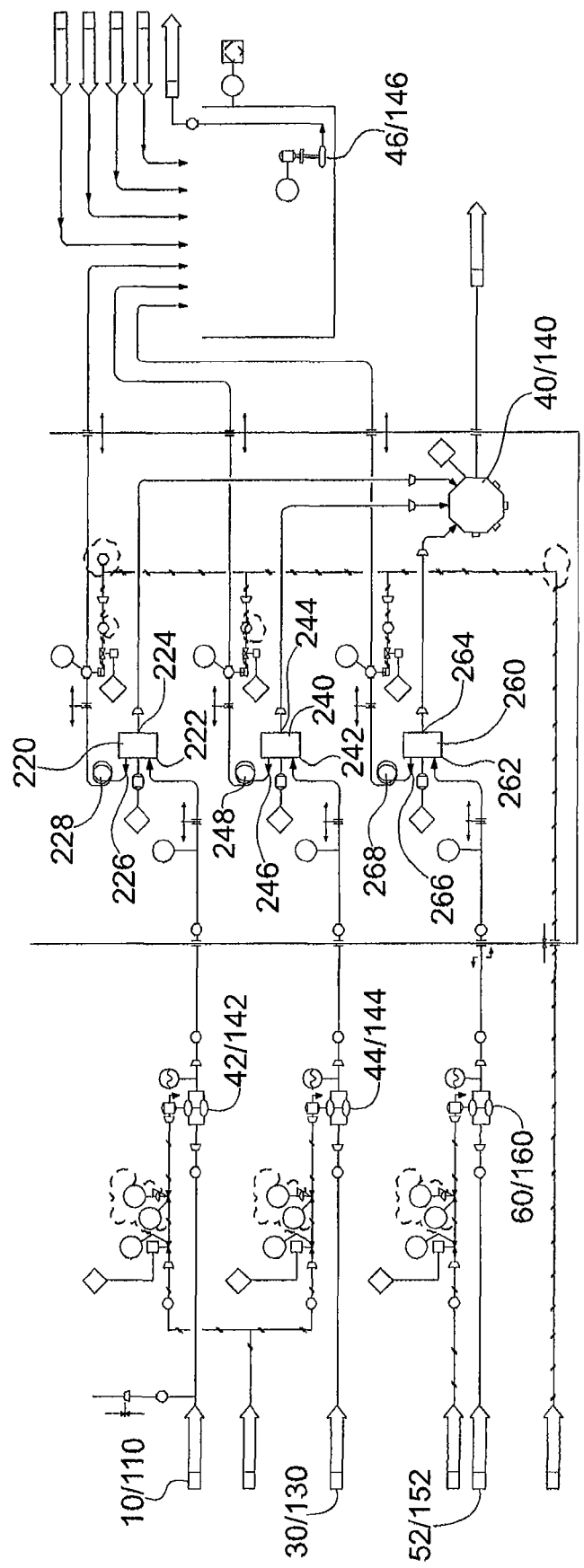
FIG. 5 shows an example of a configuration of an analytical filter assembly for use with a fluidized bed reactor perchlorate treatment system.

FIG. 5 shows an example of one preferred embodiment of an analytical filter system. Numbering corresponds, where applicable, to the component numbering of FIGS. 3 and 4. Water samples from the FBR feed 10/110, FBR effluent 30/130, or clarified, treated water 52/152 can be directed to the analyzer 40/140 for a determination of the concentration of perchlorate in each sample. Water samples can be pumped from their respective source to the analyzer, for example, through a pneumatic pump 42/142, 44/144, 60/160. Each water sample is preferably filtered prior to its intake by the analyzer, and one or more filters can be used to achieve this result. In some preferred aspects, a separate filter is used for each water sample. Thus, for example, feed water can be filtered through filter 220, treated water can be filtered through filter 240, and clarified treated water can be filtered through filter 260.

Each filter can comprise at least one feed stream inlet 222/242/262 to allow the water samples to enter the filter, at least one forward stream outlet 224/244/264 to allow filtered water to exit the filter and be taken in to the analyzer, and at least one return stream outlet 225/246/266 to allow unfiltered water to exit the filter for return to the FBR for further treatment. Unfiltered water can be returned to the FBR by using a motorized submersible pump 46/146.

Sufficient pressure is required to facilitate flow of the water sample through the filter to the analyzer. Any means suitable in the art to provide sufficient pressure can be used. Conventional means such as a valve or pressure regulator can easily clog with particulate matter present in the water such as dislodged media or biomass, thereby necessitating frequent maintenance of the system causing increased cost and reduced efficiency. It has been discovered in accordance with the present invention that the problem of clogging can be circumvented by providing a length of tubing connected to the return stream outlet to generate backpressure at the filter sufficient to facilitate the flow of the water sample through the filter, without overpressurizing the filter.

The Dionex Analyzer requires sample streams be delivered at a flow rate greater than 10 mL/min at a pressure greater than 10 psig. The pressure drop across the Collins Filter membrane is approximately 10 psi, so the operating pressure of the Collins Filter can be maintained above 20 psig. At a flow rate of approximately 1 gpm, a 250 foot length of ½" OD tubing can be used to develop the 20 psig operating pressure within the Collins Filter. At these operating conditions, a filtrate flow of approximately 150 ml/min can be delivered to the Dionex Analyzer.

The length of tubing can vary according to the operating pressure required. The Fanning or Darcey equation for steady flow in uniform circular pipes running full of liquid under isothermal conditions can be used to calculate the pressure loss across the length of tubing. The tubing can range in diameter to suit the process flow conditions. In highly preferred aspects, the tubing is configured in a coil 228/248/268. The coil configuration provides the additional advantage of requiring less space relative to a straight length of tubing, while still establishing the same pressure level that could be achieved by using a straight length of tubing.

The flow of water through the system, from the feed water source through the potable effluent water, is preferably controlled using a programmable logic controller (PLC). In some aspects, the PLC is configured to control the flow of water through the system, the pH of the feed water, and the addition of the electron donor and nutrients into the reactor in response to the concentration of perchlorate measured in the feed water and in the treated water and/or the concentration of nitrogen-containing compounds in the feed water. The PLC can also be configured to control the backwashing of the filtration system. Preferably, the PLC comprises a human machine interface to enable a human being to operate the system.

The PLC can control the coarse and fine adjustment of the water treatment time and the addition of electron donors and nutrients to the system to facilitate the degradation of contaminants in the water. One exemplary aspect of the logic that can be used in operation of the PLC is provided in FIGS. 6-10.

Figure 6:
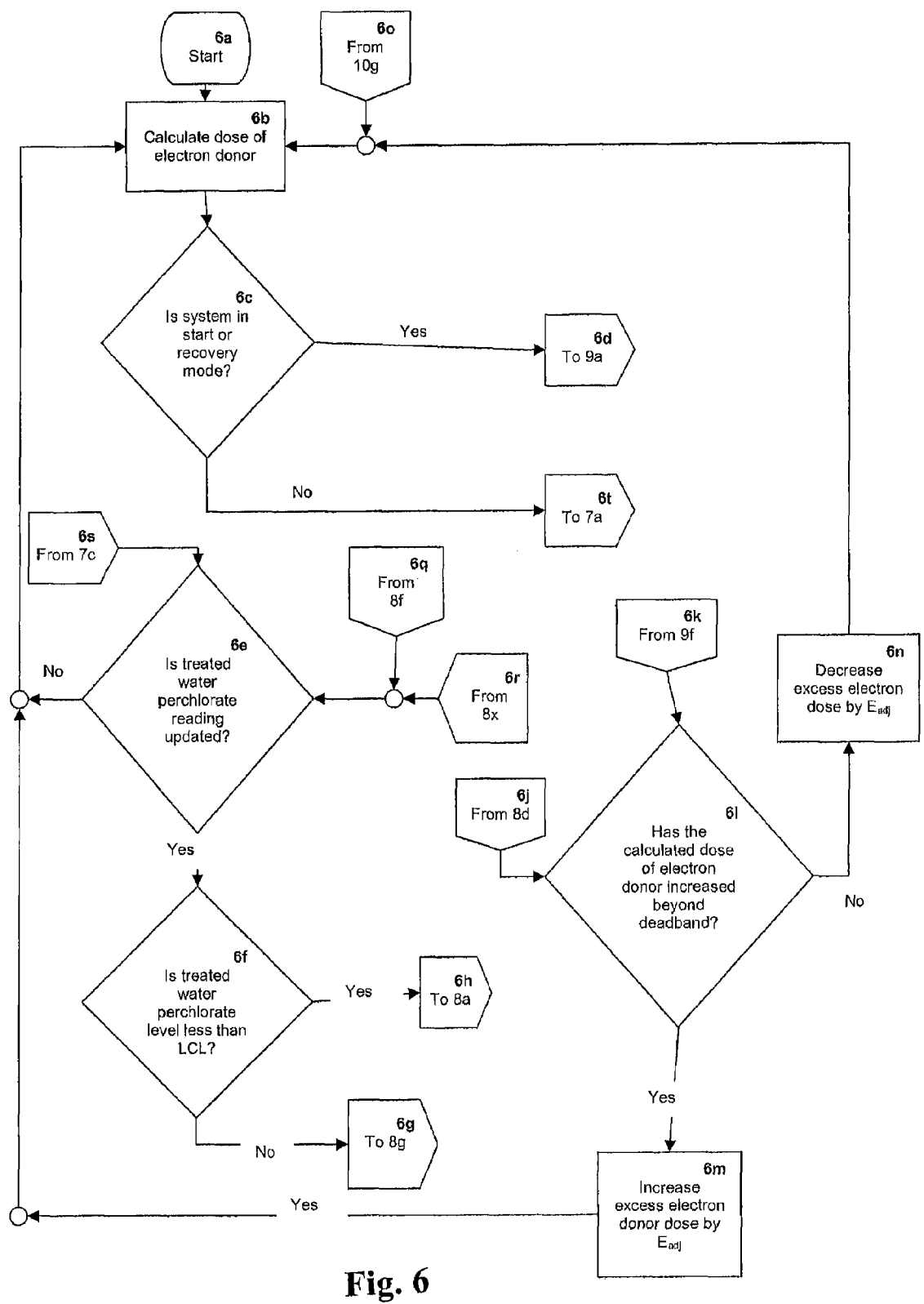
FIG. 6 shows a logic flow diagram for programmable logic controller-controlled coarse and fine adjustment of a fluidized bed reactor perchlorate degradation system.
Figure 7:
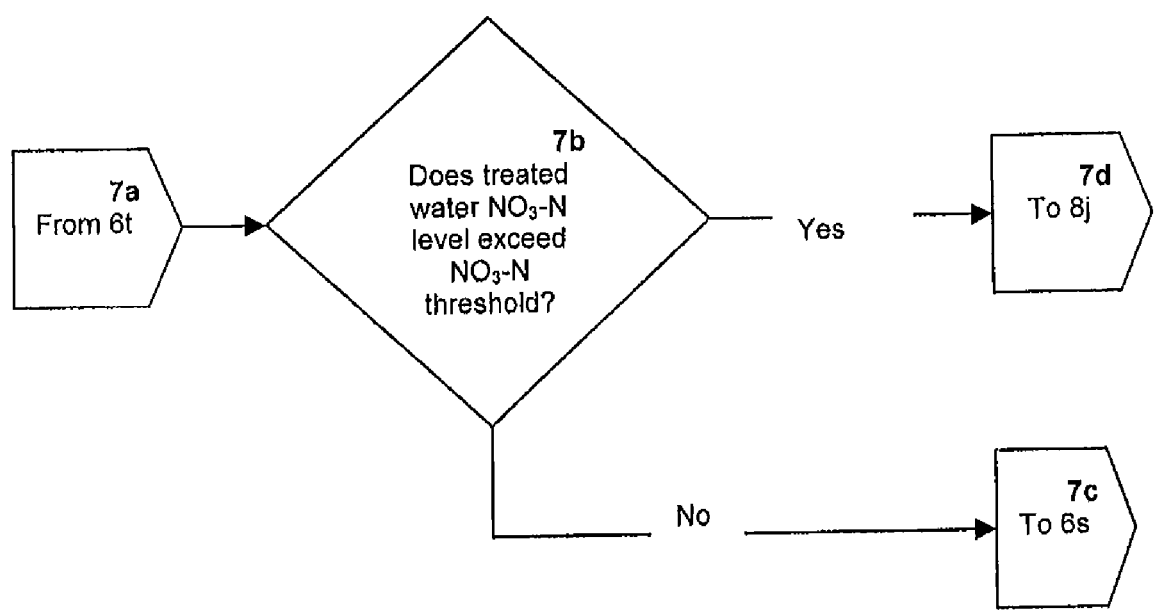
FIG. 7 shows a logic flow diagram for programmable logic controller-controlled treated water perchlorate monitoring using treated water nitrogen containing compound concentration for redundancy.

As shown in FIG. 6, the PLC can begin with a calculation the dose of electron donor required to be administered to the system. For example, a sample of perchlorate contaminated water such as feed water can be taken and the concentration of perchlorate and/or nitrogen-containing compounds in the water can be determined. The perchlorate contaminated water is contacted with a reactor comprising biomass for degrading perchlorate for a period of time sufficient to reduce the concentration of perchlorate in the water. Electron donor and/or nutrients can be added to the water in an amount effective to facilitate the degradation of perchlorated in the water. The dose of electron donor required can be calculated, for example, according to an empirical and stoichiometric relationship using the formula: $(F_1)(D.O)+(F_2)(NO_3-N)+(F_3)(ClO_4-)=E_{dose}$ (mg COD/L), where $F_1$ is a Dissolved Oxygen Factor from about 1.2 to about 1.8, D.O. is the value of dissolved oxygen, $F_2$ is a ($NO_3$—N Factor) from about 3.4 to about 5.0), and $F_3$ is a Perchlorate ($ClO_4$) Factor from about 0.5 to about 1.3.

Figure 9:
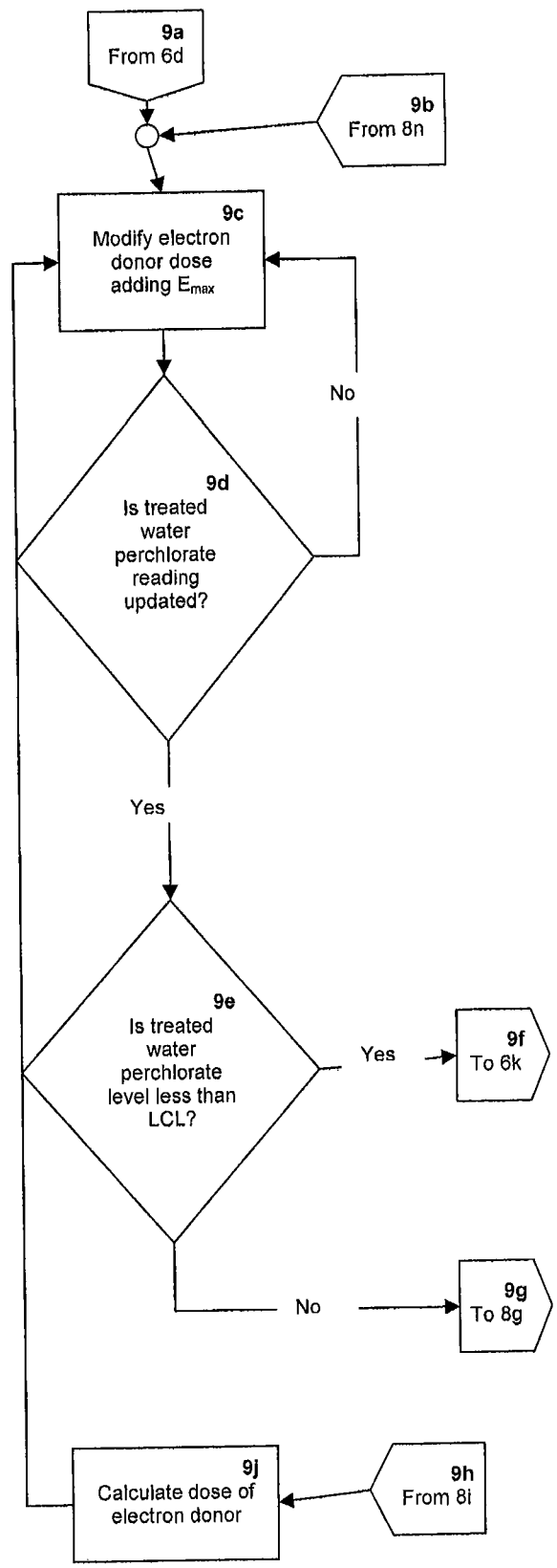
FIG. 9 shows a logic flow diagram for programmable logic controller-controlled recovery mode operation mode of a fluidized bed reactor perchlorate degradation system.

After calculation of the dose of electron donor, the system can determine if it is to operate in a Start Mode or Recovery Mode. Recovery Mode, an exemplary aspect of which is shown in FIG. 9, can be activated upon a determination of an upset in the system. During system start-up and in Recovery Mode, alteration of excess electron donor is required. Operation of start mode is illustrated in FIG. 6. After a determination that the system will operate in Start Mode, a determination can be made as to whether the concentration of nitrogen containing compounds in the water exceed an established low threshold concentration for nitrogen in the water. The concentration of nitrogen in the water can be continuously monitored in order to provide an early warning with respect to high levels of perchlorate in the water. If the concentration does not exceed the threshold level, the system can proceed to operate in Run Mode. If the concentration exceeds the threshold level, the treated water perchlorate sampling schedule can be overridden and a treated water sampling schedule can be initiated as a prelude to a switch to operation in a Recovery Mode, as shown in FIG. 9.

In proceeding to operate in Run Mode as shown in FIG. 6, a determination can be made with respect to whether a treated water perchlorate reading has been updated. Due to the processing time required for the perchlorate analyzer to process a sample, the system may have to wait until confirmation of an updated sample evaluation has been received. If the update has not been effectuated, the system can return to the step of calculating the dose of electron donor. If the update has been effectuated, the system can determine whether the perchlorate concentration in the treated water is below a lower control limit (LCL). The concentration of perchlorate in the treated water should be lower than the LCL, which is a limit that provides a buffer for treatment before a maximum control limit (MCL) is exceeded.

Figure 8:
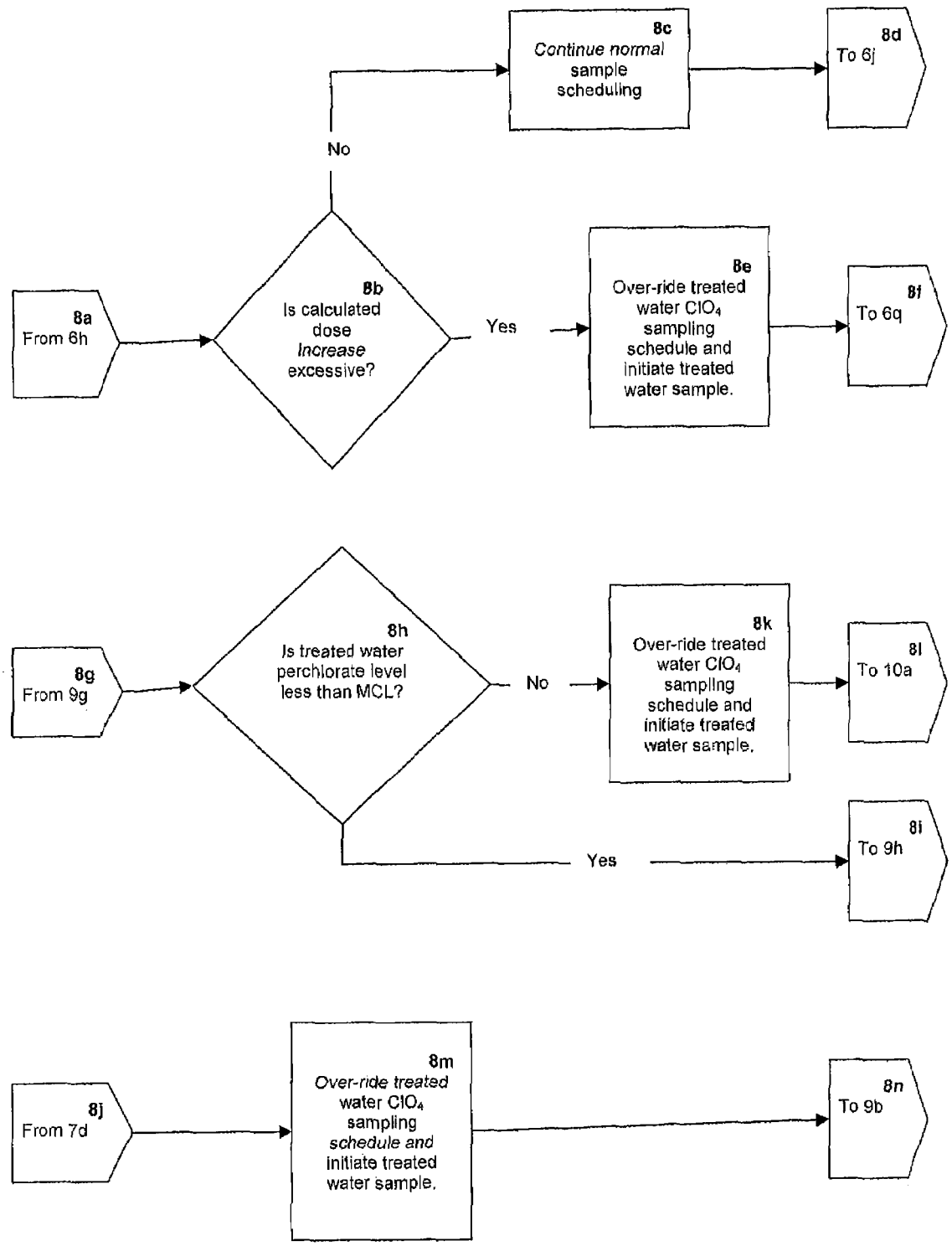
FIG. 8 shows a logic flow diagram for programmable logic controller controlled water sample scheduling.

As illustrated in FIG. 8, if the concentration of perchlorate in the water is below the LCL, a determination can be made as to whether the calculated dose increase was excessive. The calculated dose can be compared with the previously calculated does to determine if the characteristics of the feed water have changed significantly. If the feed characteristics have changed significantly since the previous evaluation, the level sampling schedule can be overridden and a sample of treated water can be taken and analyzed to determine the concentration of perchlorate in the treated water. From this analysis, it can be determined whether the treated water perchlorate reading has been updated, allowing the water treatment to continue. If the feed characteristics such as perchlorate concentration have not changed significantly relative to normal or expected perchlorate concentrations, then the level sampling schedule of Run Mode can be continued.

The next step in the logic of Run Mode can be to determine whether the calculated dose of electron donor has increased beyond deadband. For example, the current calculated dose of electron donor an be compared to a prior dose according to an operator-controlled timed basis. Each respective dose can be compared and evaluated to determine if an increase in dose that exceeds a deadband has occurred. If the calculated dose of electron donor has not increased beyond deadband, then excess electron dose can be decreased according to the value $E_{adj}$. If the calculated dose of electron donor has increased beyond deadband, then the excess electron donor can be increased according to the value $E_{adj}$, followed by a new calculation of the dose of electron donor.

Figure 10:
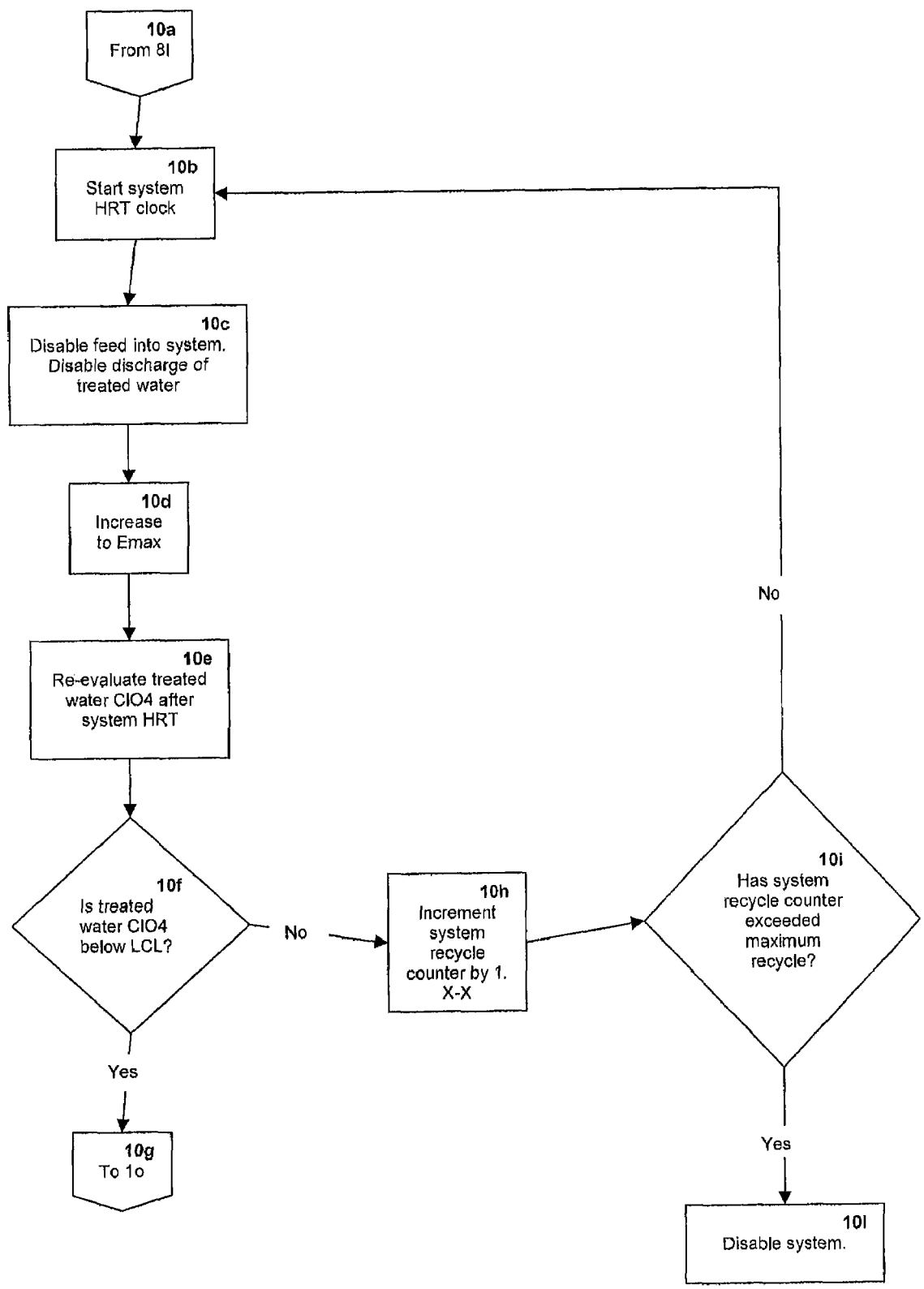
FIG. 10 shows a logic flow diagram for programmable logic controller-controlled recycle mode hydraulic retention time operation mode of a fluidized bed reactor perchlorate degradation system.
Figure 11A:
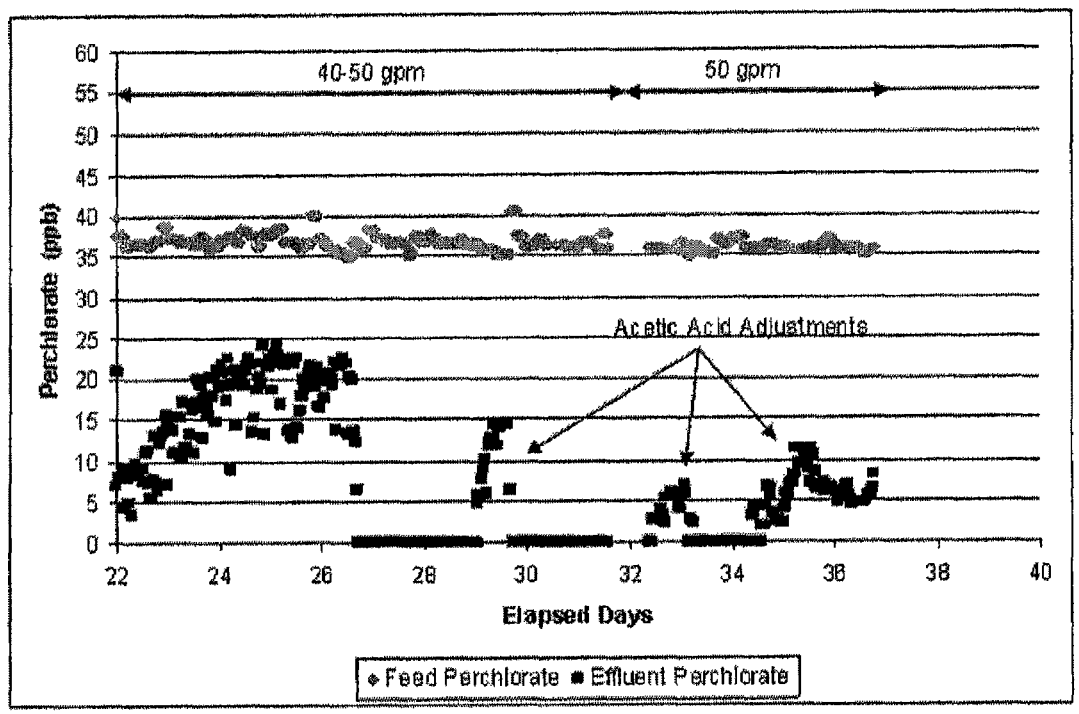
FIG. 11 shows perchlorate (A) and nitrate-N (B) removal performance during start-up for the FBR drinking water system at the city of Rialto, Calif., well number 2.
Figure 11B:
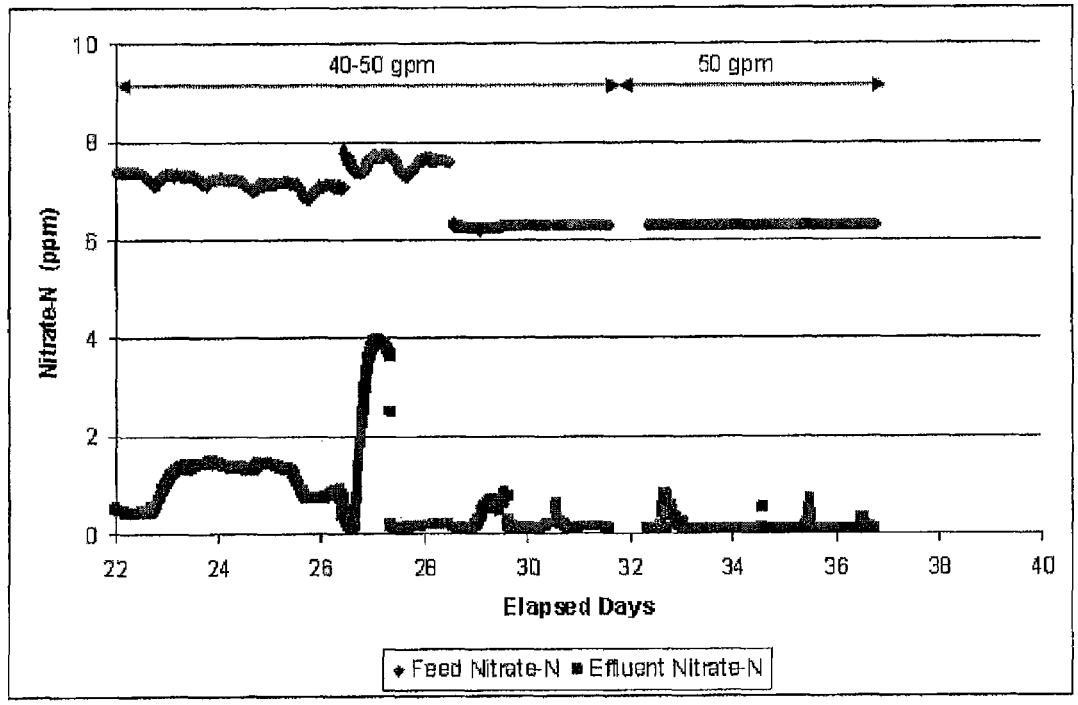

If the concentration of perchlorate in the water is higher than the LCL, a determination can be made whether the concentration of perchlorate in the treated water exceeds or is less than a MCL. The concentration of perchlorate in the treated water is evaluated against the MCL to ensure that inadequately treated, perchlorate contaminated water is not discharged from the system. If the concentration of perchlorate exceeds the MCL, the standard operation water perchlorate sampling schedule can be overridden and the treated water perchlorate sampling schedule can be concomitantly initiated, and the system can switch to operation in a Recycle Mode, as shown in FIG. 10. If the concentration of perchlorate is less than the MCL, the system can switch to operation in a Recovery Mode, as shown in FIG. 9. Prior to entry into the Recovery Mode, a calculation of the dose of electron donor required to facilitate degradation of the excess perchlorate can be made, for example, according to the electron donor calculation formula described and exemplified herein.

Recovery Mode can be utilized to bring any upset in conditions such as perchlorate or nitrogen concentration in feed or treated water back within acceptable ranges or values. As a first step in Recovery Mode, the electron donor dose can be modified by adding additional electron donor ($E_{max}$) to the calculated concentration of electron donor, $E_{dose}$. The addition of $E_{max}$ facilitates treatment of perchlorate during system upset conditions and system start-up mode. Following the addition of $E_{max}$, a determination can be made regarding whether the perchlorate concentration in the treated water has been updated according to recent perchlorate concentration analyses. Due to the processing time required for the perchlorate analyzer to process a sample, the system may have to wait until confirmation of an updated sample evaluation has been carried out and received.

If the reading has been updated, a determination can be made with respect to whether the concentration of perchlorate in the water treated through the Recovery Mode is less than the LCL. If the concentration is less than the LCL, the water can continue to be treated through Run Mode, beginning with a determination of whether the calculated dose of electron donor has increased beyond deadband, as described above. IF the concentration of perchlorate is higher than the LCL, a determination can be made if the concentration of perchlorate is less than or exceeds the MCL, as described above.

Recycle Mode can be implemented to reduce perchlorate concentrations to below the LCL. As shown in FIG. 10, upon commencement of Recycle Mode, the system hydraulic retention time (HRT) clock can be started. The purpose of the HRT clock is to calculate the theoretical time required for a particle of water to travel through the system. While the system is in Recycle. Mode, the feed is disabled to stop feed water from entering or leaving the system. Following disabling of the feed, the electron donor dose can be modified by adding additional electron donor ($E_{max}$) to the calculated concentration of electron donor, $E_{dose}$ to facilitate perchlorate degradation in the Recycle Mode.

After addition of electron donor $E_{max}$, the HRT clock can be allowed to expire, and the perchlorate concentration in the treated water can be re-analyzed. Upon re-analyzing the perchlorate concentration, a determination can be made with respect to whether the concentration of perchlorate in the treated water is below the LCL. If the concentration is below the LCL, the system can exit Recycle mode and operation of the system can proceed in Run Mode. If the concentration of perchlorate is higher than the LCL, the system HRT counter can be increased by increments of one. Attempts to reduce the perchlorate concentration in the treated water are limited to the HRT counter. Thus, a determination can be made if the system recycle counter has exceeded its maximum recycle limit. If the recycle limits are exceeded, the system can be disabled. If the recycle limits are not exceeded, Recycle Mode can begin anew with the starting of the HRT clock.

The following examples are provided to illustrate, but not to limit the invention.

EXAMPLE 1

The Use of a Full Scale Fluidized Bed Reactor System for the Treatment of Perchlorate in Groundwater to Drinking Water Standards A demonstration study was conducted to treat perchlorate laden groundwater to drinking water standards using a fluidized bed biological reactor treatment train.

This study focused on demonstrating: (1) the bioremediation of nitrate and perchlorate contaminated groundwater to current method reporting limits through a fluidized bed bioreactor with an added electron donor; (2) the short- and long-term performance effects in self-inoculating the system with the incoming groundwater; (3) the resulting short-term performance effects in the simulation of both a feed pump failure and an electrical shutdown; (4) the use of on-line, nitrate and perchlorate analyzers to continuously monitor the system treatment performance and to provide feed-forward control of the electron donor addition; (5) the use of a post aeration vessel, multimedia filter, and liquid granular activated carbon (LGAC) to produce a potable-like effluent water stream; and (6) the disinfection effects via chlorination and ultraviolet light on the system effluent.

Using only the groundwater to microbiologically seed the system, the FBR treatment plant removed all of the nitrate and perchlorate at the design loading conditions to meet the State of California Public Health Goal standards. In addition, the downstream equipment was operated to produce an effluent water of potable quality, meeting all State of California primary and secondary MCL requirements. The restart of the plant after the artificially induced system interruptions was rapid and required less than 24 hours to achieve acceptable treatment performance. The use of on-line instrumentation for rapid analysis of system performance proved effective and reliable. Such instrumentation was able to effectively control the feed rate of acetic acid, the chosen electron donor, to meet all performance objectives. Finally, chlorination disinfection studies indicated that *E. Coli* was not formed within the system, disinfection byproduct formation potential did not exceed State of California water standards, and microbial effluent concentrations could be effectively controlled using a CT value of 4.

Currently, the FBR is one of two biological treatment technologies approved by the California Department of Health Services (CADHS) as "permittable" for treatment of perchlorate-contaminated water to drinking water. The FBR is a fixed-film reactor in which the biological media is suspended or fluidized within the reactor vessel by the upward flow of water through the system. The media particles provide a large surface area for microbial growth and promote a highly dense biomass. An electron donor (e.g., acetic acid) is provided to the FBR where, under anoxic conditions, it is used in the denitrification/perchlorate reduction process. The byproducts of the process are nitrogen gas, chloride ions, carbon dioxide, heat generation, and additional biomass.

CADHS imposed operational and performance-based conditions on the FBR treatment train to produce drinking water. These conditions were established as minimum requirements to obtain an operating permit that allows the system effluent water to enter into a drinking water distribution network. The system in this study was being used for research purposes only, so a permit for distribution was not requested. However, the CADHS suggested that the conditions required for a potential permit application be demonstrated at this smaller scale. Such actions would then allow the City of Rialto to potentially request a permit for a larger full-scale system without the necessity of demonstrating the various aspects of the conditions.

The FBR system was operated in the City of Rialto (Calif.) on water extracted from Rialto Well #2. Approximately 50 gpm of contaminated groundwater was biologically treated via anoxic nitrate and perchlorate reduction through the FBR. Nitrate-N and perchlorate concentrations in the feed groundwater were approximately 6 mg/L and 50 µg/L, respectively. After the FBR, the water then passed through a post-aeration unit operation, where the oxygen concentration was increased. Additional downstream equipment included a multimedia filter capable of performing solids removal and an LGAC system capable of removing taste and odor compounds. After treatment, this perchlorate and nitrate free water was made available for groundwater recharge.

Methods

Plant Description. The FBR drinking water treatment plant comprises a number of individual systems working in conjunction to produce potable water. The principle perchlorate treatment unit was the FBR reactor (FIG. 1). The FBR reactor system utilized in this study was a 3.0-foot diameter by 17 foot high, stainless steel tank, capable of treating at least 50 gallons per minute (gpm). The perchlorate-contaminated feed water was pumped from the wellhead and fed directly into a recycle line of the reactor. The feed and recycle water entered the vessel through an inlet header at the bottom of the reactor and were distributed through lateral piping and nozzles. The fluid passed upward through the carbon media (Jacobi Carbons Aquasorb, Philadelphia, Pa.), causing the media to hydraulically expand approximately 28% of the settled bed height.

Through a self-inoculating process from the contaminated feed water, microorganisms attached to the fluidized media. Adequate quantities of electron donor and nutrients, 50% (v/v) of NSF (National Sanitary Foundation) approved acetic acid and 85% wt. of NSF approved phosphoric acid (Univar, Los Angeles, Calif.), respectively, were added to the reactor. Utilizing this electron donor and nutrient, the attached microorganisms performed an oxidation/reduction reaction in consuming all of the dissolved oxygen, nitrate, and perchlorate. As the microorganisms grew, the amount of attached microbes per media particle also increased. Since the microbes primarily consist of water, the volume of the microbe/media particle increased, but the specific density decreased. This allowed the media bed to expand and fluidize further such that longer hydraulic retention times could be achieved for contaminant removal. The treated fluid flowed into a submerged recycle collection header pipe and the effluent collection header pipe at the top of the reactor. A portion of the fluid exited the FBR system to a post-aerator while the balance was recycled back to the suction of the influent pump. An in-bed biomass eductor controlled bed height growth by physically separating biomass from the media particles. A bed expansion of 40-60% of the settled bed height was targeted. Any excess biomass that was separated from the media exited the system through the effluent collection system.

Figure 2:
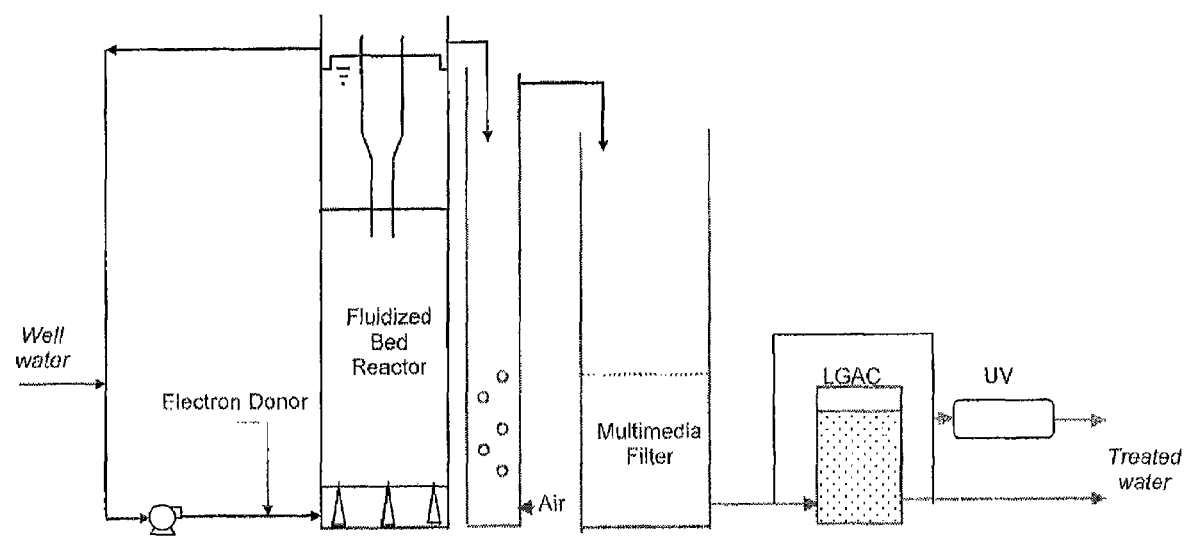
FIG. 2 shows a schematic of an example of a fluidized bed reactor drinking water treatment plant.

After the FBR vessel, the water was treated through a number of post-treatment steps (FIG. 2). Through the post-aerator vessel, the dissolved oxygen was increased to pre-FBR concentration levels. The effluent from the post-aerator passed through a Siemens Trimite TM-50A Multimedia Filter (Ames, Iowa), where solid/particulate matter was removed through an adsorption clarifier (10 gpm/ft$^2$) and mixed-media chamber (5 gpm/ft$^2$). An NSF-approved flocculating agent (48% aluminum sulfate, Sterling Water Technologies, Columbia, Tenn.) and polymer (20% cationic Callaway polymer, Kemiron, Fontana, Calif.) were added to the post-aerator effluent water prior to introduction to the Trimite filter. This chemical addition allowed more efficient suspended solids-removal by the adsorption clarifier and multimedia filter (effluent water at <0.3 NTUs). The effluent from the multimedia filter then passed through a Westates Carbon Model Number ASC-1000 liquid granular activated carbon tank at 4 gpm/ft$^2$ Los Angeles, Calif.) to remove any taste and odor causing compounds and to serve as a final polishing step for the overall treatment train. A backflush/effluent tank system capable of storing backwash water for the multimedia filter system was also part of the treatment plant. To meet the final requirements of potable water production, a slipstream of the water was passed though a Trojan SWIFTTM SC A02UV reactor (Trojan Technologies Inc., Ontario, Calif.) with low pressure, high intensity, amalgam lamps to adequately disinfect the effluent (minimum dose rate of 40 mJ/cm$^2$).

Analytical. The plant was completely automated via a programmable logic controller (PLC) and a supervisory Control and Data Acquisition (SCADA) system. Extensive analytical testing of the complete system was conducted using on-site instrumentation, on-site laboratory procedures, and off-site laboratory procedures (Table 1). Key operating parameters monitored included system feed flowrate, FBR recycle flowrate and inlet pressure, bed height, electron donor and nutrient addition rates, recycle water pH, temperature, and oxidation/reduction potential (ORP), blower pressure and temperature, coagulant and polymer addition rates, multimedia filter flush cycle and backwash frequency, filter effluent turbidity measurements, and system pressure readings.

TABLE 1

A partial list of analytes measured on-site and off-site with limits.

| Analytes | Federal or California State Standard/PHG |
| --- | --- |
| Perchlorate | 6 µg/L |
| Metals (Ba, Cd, Cr, Fe, Pb, Mn, Ni, Zn, Hg) | Varies per metal |
| Anions (Nitrate, nitrite, phosphate, sulfate, chloride) | Nitrate-N/Nitrite-N <10 mg/L  Sulfate and Chloride <250 mg/L |
| Total Dissolved Solids | 500 mg/L |
| Color | 15 units |
| Haloacetic Acids (Five) | 60 µg/L |
| Total Trihalomethanes | 80 µg/L |
| Heterotrophic Plate Counts | <500 CFUs/ml |
| Total/Fecal Coliform | <1 MPN/100 ml |
| Turbidity | <0.3 NTUs |

Two on-line nitrate analyzers, NITRATAX plus sc Sensors, 5 mm path length with a nitrate-N range of 0.1-25 mg/L NO$^2$/3-N (HACH, Inc., Denver, Colo.), were used to continuously measure nitrate-N at the feed and effluent of the FBR reactor. Such analyzers were tied into the feed forward control logic to modify the electron donor addition rate as needed to ensure consistently good nitrate removal.

The on-line, real-time perchlorate analysis was measured by a Dionex DX-800 Process Analyzer (Sunnyvale, Calif.), with an IonPac AS16 Analytical Column, 2×250 mm, IonPac AG16 Guard Column, 2×50 mm, IonPacAG16 Concentrator, 4×50 mm, ASRS-ULTRA 92 mm Anion Self-Regenerating Suppressors, an EluGen II Hydroxide Cartridge, Sandpiper Double. Diaphragm Sampling Pump, Collins Membrane Sampling Filter, and a Dionex SS80 Multiport Sampling Valve. This complete on-line perchlorate analyzer and sampling system allowed samples of water to be collected at the influent and effluent of the FBR system and to be analyzed by the instrumentation in alternating fashion. Using the PLC to control the sampling and analyzer activity, up to twenty-four samples per day were obtained and analyzed for the influent and effluent of the FBR. From such readings, feed forward control logic was implemented to modify the electron donor addition rate to allow for complete removal of the perchlorate by the FBR. The on-line perchlorate results were corroborated twice a week by an outside laboratory (Emax Laboratories, Inc., Torrance, Calif.).

Results

The system demonstration consisted of a six month operational period. During the first two months, the focus of the demonstration was on system loading (including microbial self-inoculation with groundwater), performance optimization and ensuring that all system components functioned individually and in conjunction. The last four months focused on long-term operation, plant shut down scenarios, and the chlorination/UV disinfection studies.

The system began operation at 30 gpm and was ramped up to the design operating feed flow of 50 gpm over a four week period. Oxygen, nitrate-N, and perchlorate feed concentrations were 8-9 mg/L, 5.7-6.3 mg/L, and 45-55 µg/L, respectively. The self-inoculation procedure required approximately one month of system operation before complete removal of the nitrate-N and perchlorate was demonstrated (FIGS. 11-14). Once complete removal of nitrate-N and perchlorate was demonstrated (days 27-29), the adjustable parameters of the feed forward control logic of the acetic acid were adjusted to minimize electron donor addition while maximizing treatment performance. The amount of electron donor required was directly proportional to the feed oxygen, nitrate-N, and perchlorate concentrations. A stoichiometric amount of acetic acid, plus an additional residual, was added to ensure treatment of all of the perchlorate contaminant. The amount typically required was 0.23 gpd, but was adjusted by the PLC as loading conditions changed.

Once the required amount of acetic acid was determined and steady state performance demonstrated, the plant was subjected to two feed shutdown experiments and one plant shut down experiment (complete electrical failure), all approximately five days in length. After the first feed shutdown experiment, upon restart, the plant performance recovered within 24 hours. This length of time for recovery was also affected by turbidity issues (exceeding 0.3 NTUs) from the Trimite Filter. The second feed shutdown experiment resulted in a recovery period of less than five hours upon restart. The complete plant shutdown recovery period was less than two hours.

Figure 15:
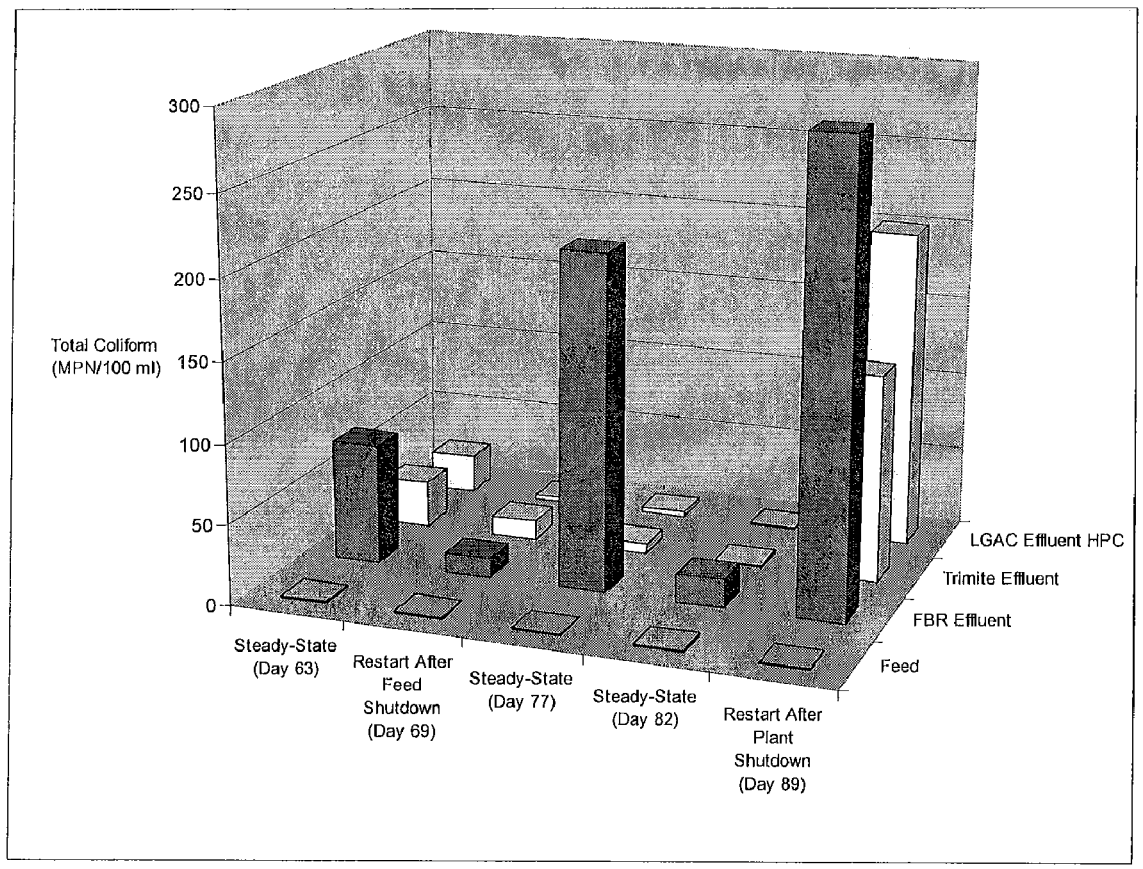
FIG. 15 shows total coliform numbers during various stages of plant operation.
Figure 16:
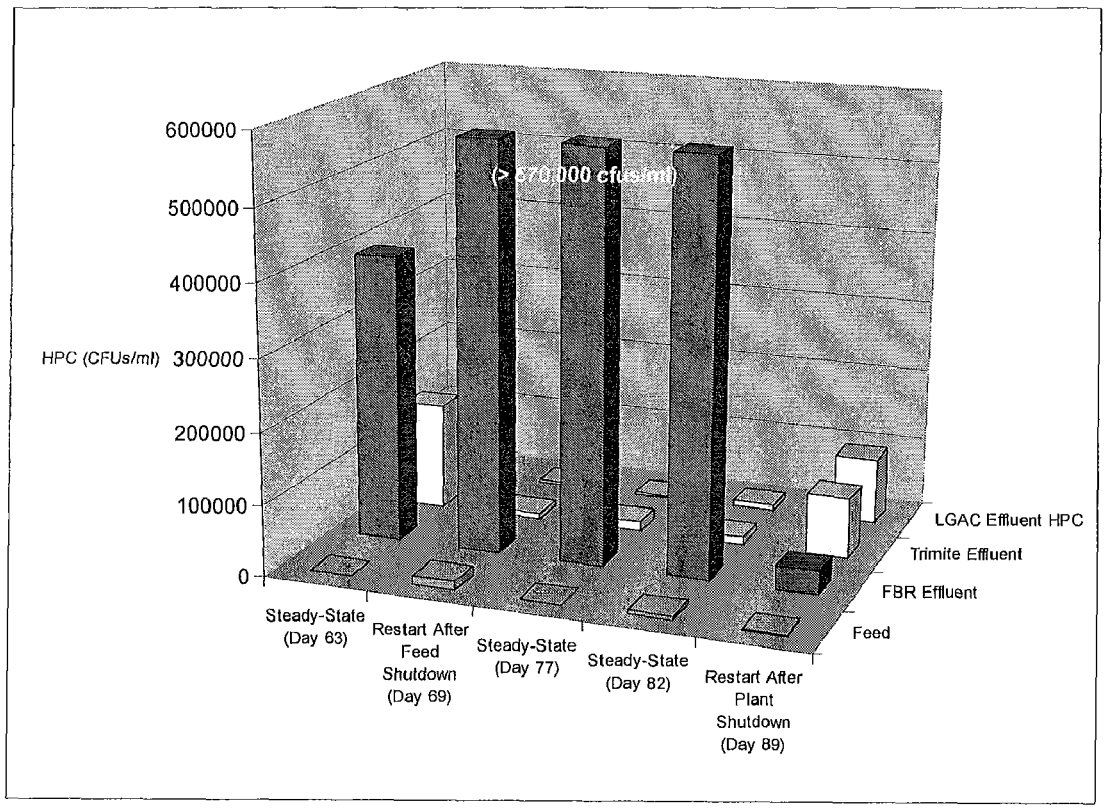
FIG. 16 shows heterotropic plate counts during various stages of plant operation.

Concerns about the potential pathogenic microbiological carryover from the FBR to the Trimite filter, and the subsequent disinfection by-product formation potential, prompted the measurement of total coliform, E. coli, and heterotrophic plate counts at the FBR feed, FBR effluent, Trimite filter effluent, and LGAC effluent via an outside laboratory (E.S. Babcock & Sons, Inc., Riverside, Calif.). Total trihalomethane (TTHM) and haloacetic acid 5 (HAA5) formation potential were also measured at the filter effluent. These measurements occurred during system steady-state operation, the last feed shutdown experiment, and the plant shutdown experiment (FIGS. 15 and 16). Results showed total coliform presence (FIG. 15), but no *E. coli* presence (<1.0 MPN/100 ml) across the entire system (data not shown). TTHM and HAA5 never exceeded State Standards (Table 2).

TABLE 2

Total trihalomethane and haloacetic acid formation potential after the Trident Multimedia Filter for various operating scenarios.

| | Operating Condition | | | |
|---|---|---|---|---|
| | Steady-State (Day 34) | Restart After Feed Shutdown (Day 69) | Steady-State (Day 77) | Restart After Plant Shutdown (Day 89) |
| TTHMs (µg/L) | 13.00 | 9.9 | 6.2 | 8.5 |
| Bromodichloromethanes | 4.20 | 3.2 | 2.2 | 2.7 |
| Bromoform | 0.93 | 1.4 | 0.64 | ND (<0.5) |
| Chloroform | 5.00 | 2.4 | 1.7 | 2.4 |
| Dibromochloromethane | 3.30 | 2.9 | 1.6 | 2.9 |
| HAA5 (µg/L) | 22.00 | 18 | 7.5 | 10 |
| Monochloroacetic acid | 14.00 | 12 | ND (<2.0) | 2.9 |
| Dichloroacetic acid | 3.50 | 1.9 | 3.0 | 3.1 |
| Trichloroacetic acid | 2.00 | 1.5 | 1.7 | 2.2 |
| Monobromoacetic acid | 1.30 | 1.4 | ND (<1.0) | ND (<1.0) |
| Dibromoacetic acid | ND (<1.0) | ND (<1.0) | 1.1 | 1.4 |

In addition to these tests, a chlorination study was conducted to determine what CT (concentration of chlorine dosage×contact time) was required for effective disinfection. Results indicated that a four-log inactivation of total coliform was not possible to demonstrate (based on low, initial concentrations of total coliform). However, a four-log inactivation of microorganisms based on heterotrophic plate counts (HPC) was possible to demonstrate. From the HPC measurements, it was determined that a CT of 4 was required for a four-log inactivation of total heterotrophs.

Figure 12A:
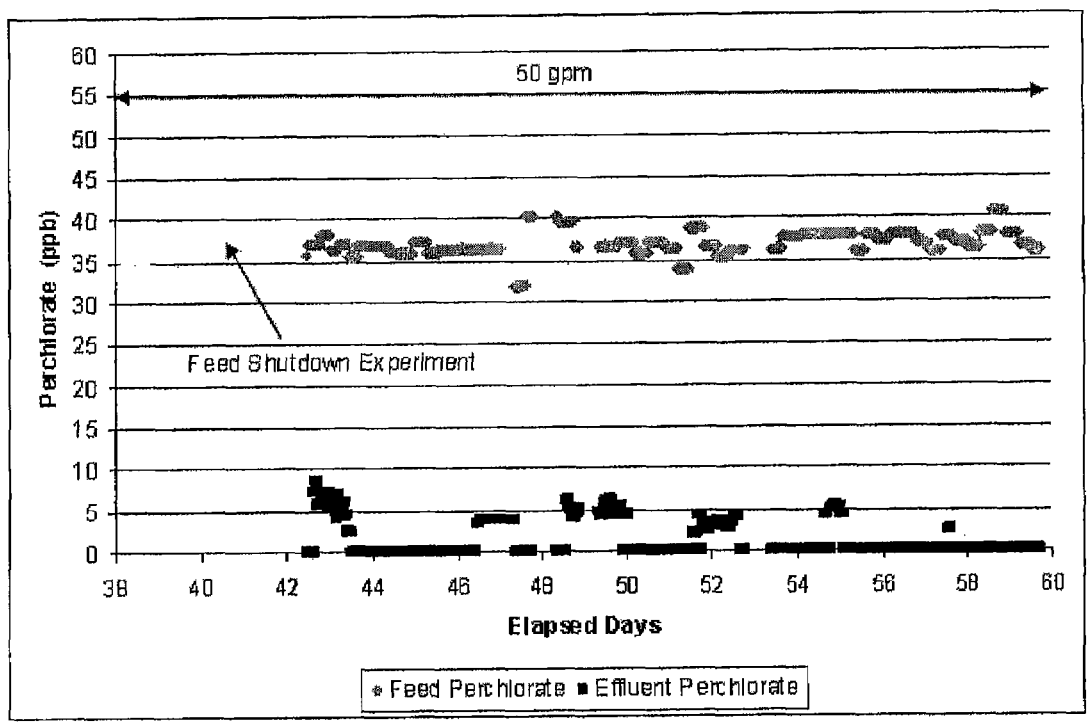
FIG. 12 shows perchlorate (A) and nitrate-N (B) removal performance after feed shutdown and during steady state for the FBR drinking water system at the city of Rialto, Calif., well number 2.
Figure 12B:
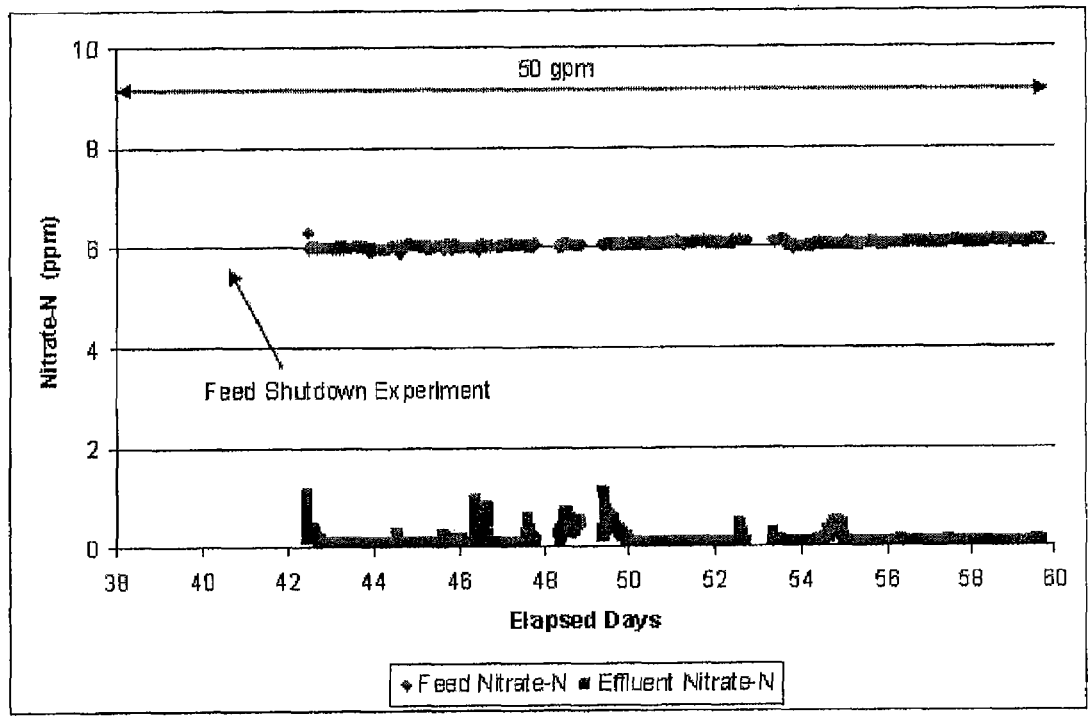
Figure 13A:
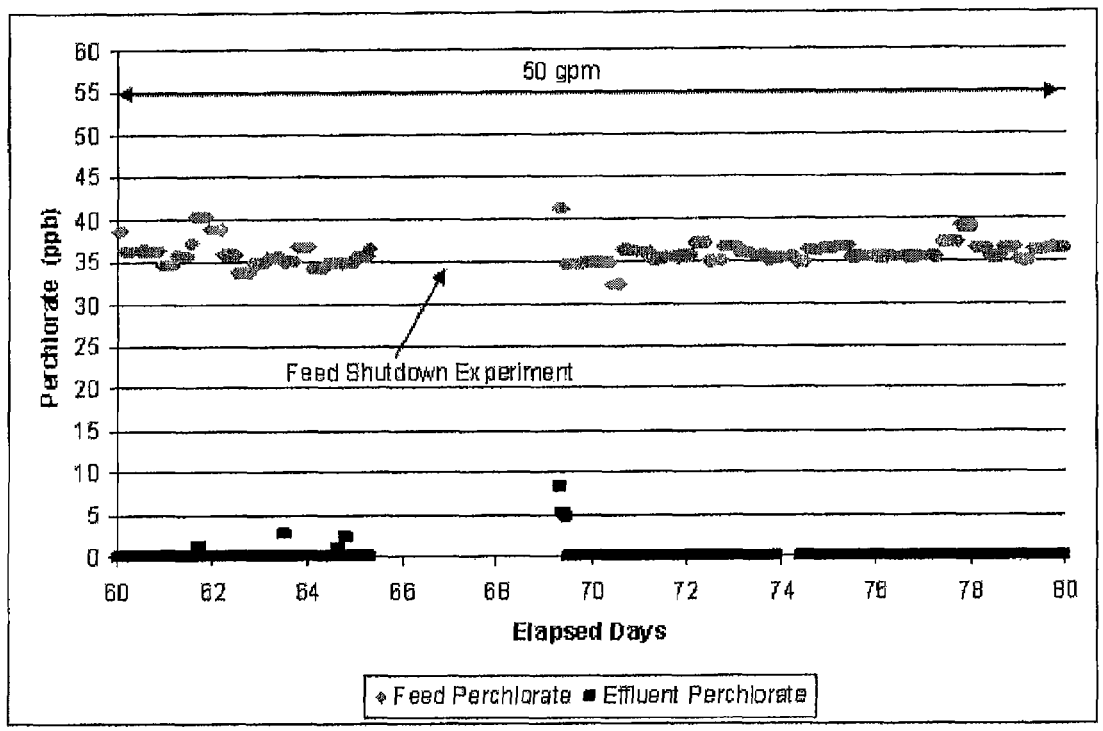
FIG. 13 shows perchlorate (A) and nitrate-N (B) removal performance after a second feed shutdown and during steady state for the FBR drinking water system at the city of Rialto, Calif., well number 2.
Figure 13B:
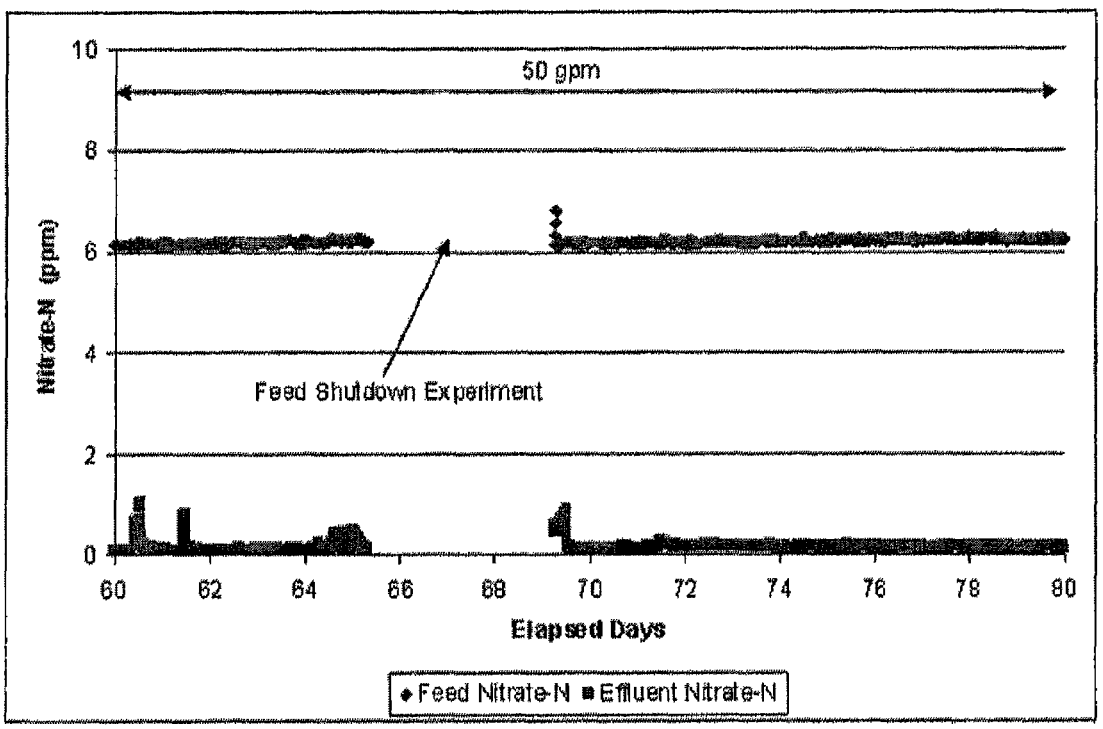
Figure 14A:
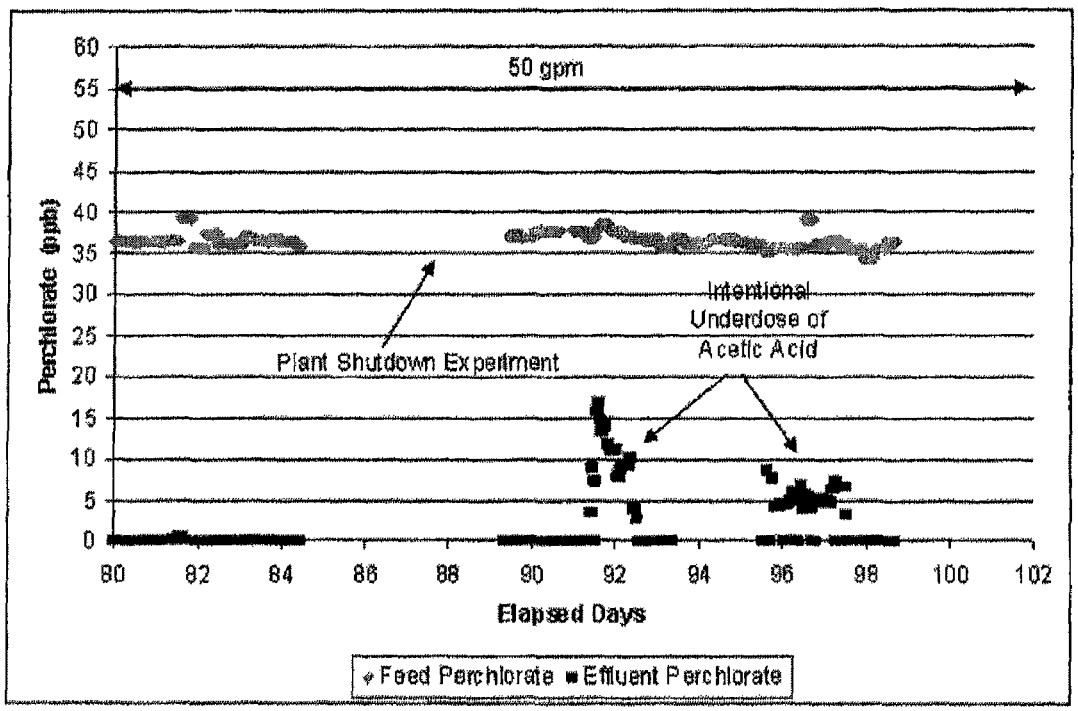
FIG. 14 shows perchlorate (A) and nitrate-N (B) removal performance after plant shutdown and during steady state for the FBR drinking water system at the city of Rialto, Calif., well number 2.
Figure 14B:
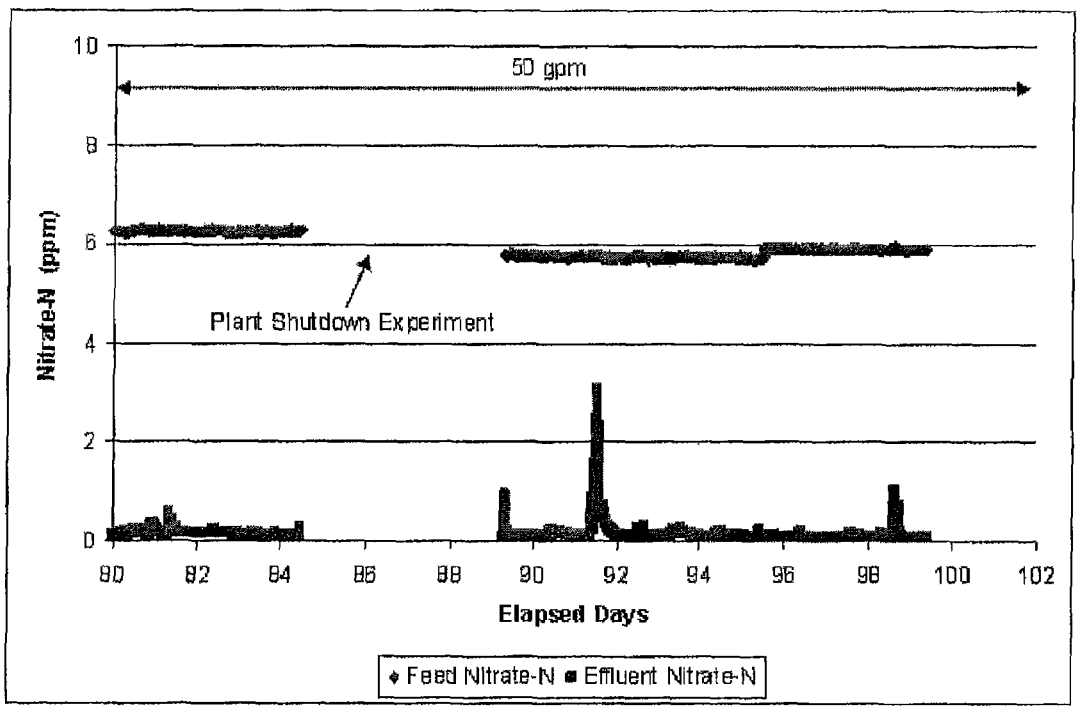

Self-Seeding, Continuous Plant Operation and Shutdown Effects. This study demonstrated that low concentrations of perchlorate, coupled with a three-fold magnitude higher nitrate-N concentration, could be effectively removed using the FBR Treatment Plant. Self-seeding of the plant using microbes from the existing groundwater proved to be an acceptable procedure to effectively start-up the system. The system start-up took approximately one month before complete nitrate-N and perchlorate removal was observed. This start-up period could have possibly been expedited as typical plant start-up problems (instrument malfunctions, programming issues, etc.) were encountered that hampered consistent feed to the plant. Once the microbial population was established, the continuous operation of an in-bed biomass eductor was required to maintain a consistent bed level. Evidenced by the rapid recovery of the system performance after two plant feed shutdowns and one complete electrical shutdown (simulated), the microbial population was robust and capable of a responding quickly (FIGS. 12-14). Each subsequent recovery period after the two feed and one plant shutdown(s) was shorter. This is attributable to the microbial population becoming more established and maturing over time within the FBR.

Surface Water Treatment Equipment Effectiveness. The surface water treatment portion of the plant operated effectively. The post-aeration vessel raised the dissolved oxygen concentrations from less than 1 mg/l to above 7.5 mg/l consistently. No blockage or operational issues were observed with the blower utilized to reaerate the water.

Continuous operation of the in-bed eductor resulted in the requirement of chemical addition to the downstream equipment. Initially, the amount of biomass removed from the FBR caused the Trimite filter to produce water with a turbidity above 0.5 NTUs. For this reason, 48% NSF aluminum sulfate and 20% NSF cationic polymer were tested as coagulating and flocculating agents, respectively. Upon addition of these chemicals (cationic polymer diluted to 0.8%), the effluent turbidity of the Trimite filter was reduced to less than 0.1 NTU. There is a trade-off in the amount of chemical addition versus the necessary frequencies of the adsorption clarifier forward flush and multimedia backwash frequency. After a number of iterations at different chemical dosages, the addition of 0.4 gpd of the 1% aluminum sulfate and 1 gpd of the 0.8% cationic polymer were found optimal. Such additions resulted in six adsorption clarifier flushes per day and one multimedia filter backwash per day.

The LGAC system was always protected from higher turbidity water by the PLC. Typically, only drinking quality water passes through this vessel. Pressure drops were minimal (<1 psi) and biomass clogging was not observed.

Microbiology and Chlorination Study. The amount of microorganisms produced across the entire plant varied depending on the operating conditions of steady-state, feed restart, or plant restart (FIG. 16). With all microbial enumeration techniques, variabilities exist that are often difficult to quantify between samples. These variabilities can be because of differing sampling techniques, heterogeneities in the sample matrix, and differing analytical interpretation of results (both false-positives and negatives). For these reasons, the microbial data must be observed for longer periods of time not afforded for this demonstration. However, the two overlying factors were consistent throughout the demonstration: (1) No portion of the treatment plant fostered the growth of *E. coli*. The initial microbial population that existed in the wellhead did not contain pathogens. Subsequently, the presence of such pathogens was not observed through the entire plant. (2) The presence of microorganisms in all phases of system operation did not contribute to TTHM or HAA5 formation that exceeded State of California standards.

Even though pathogens were not observed in the plant effluent water, disinfection treatment of such water to reduce total coliform and heterotrophic plate count was necessary. Under worst case operating conditions (after a plant shutdown and restart), the chlorination tests demonstrated that a three to four log inactivation of HPC could be observed at a CT of 4 (ideally 1.0 mg/l at a contact time of 4 minutes). Based on the U.S. EPA Surface Water Treatment Rules Guidance Manual, such a CT at the plant operating temperature and pH would also be adequate for virus protection.

On-Line, Continuous Real-time Instrumentation. The operation of the on-line nitrate and perchlorate analyzers worked effectively in providing feed forward control of the electron donor. Minimal problems occurred with the operation of either the feed or effluent nitrate analyzers. No filtration system existed prior to the nitrate analyzers that continually received water for analysis. Daily observation of the feed and effluent lines was required to ensure that flow existed to and from each instrument. However, the required flow to provide accurate analytical measurements was minimal (a few mls/min). Hence, it was possible to operate the system for three to four days without the lines being cleared. Data registered between the on-line instrumentation and the off-site laboratory analysis (not provided) for nitrate-N agreed on average within 8.5% for the feed and 29% for the effluent. The large percentage difference in the effluent is a result of the outside laboratory having a minimum detection limit (MDL) of 0.05 mg/l nitrate-N while the on-line instrument MDL was 0.1 mg/l. This difference in MDLs skews the data for comparison. The on-line nitrate-N analyzer consistently demonstrated its MDL for the effluent during steady-state operation.

For the Dionex perchlorate analyzer, the instrument was robust in the field. However, certain precautions were warranted. The sampling filtration system consisted of a fine Teflon 0.2 micron filter (Collins Products, Livingston, Tex.) that worked effectively to protect the internal components of the Dionex IC system. The filters required daily cleaning when sample acquisition was as high as twelve samples per day. The use of a roughing filter prior to the sampling filtration system is suggested, and would provide adequate protection to extend the life of the fine filter. The on-line instrument also had a consistent, low bias in reportable perchlorate concentrations. On average, the field instrument reported the feed concentration to be 36.2 μg/L, while the outside laboratory reported 52.1 μg/L. This difference was attributable to sample preparation technique within the Dionex instrument compared to the outside laboratory. However, the difference between the reported field values and the outside laboratory perchlorate values were minimal in terms of controlling the feed flow of electron donor. An excess of electron donor is always provided to account for variabilities in the feed water composition that absorbed this difference in readings. This inherently low bias was not observed repeatedly for the reported effluent perchlorate concentrations by the on-line instrument. The detection limit for the on-line instrument was determined to be 2.3 μg/L, while the outside laboratory instrument detection limit was 0.5 μg/L. The on-line nondetects were corroborated twice a week by the outside laboratory.

Summary. The use of a biological approach to remediate a contaminated aquifer to drinking water standards in the Rialto Colton basin was demonstrated for the first time. Based on meeting all of the objectives, the operation of the demonstration-scale FBR Drinking Water Treatment Plant at Rialto Well #2 was successful. Utilizing a self-seeding microbial inoculation process from the native groundwater, complete nitrate-N and perchlorate treatment was observed across the FBR within one month. Subsequently, the electron donor feed rate was adjusted both manually and via the PLC using feed forward control logic based on real-time on-line analyses of nitrate and perchlorate at the plant effluent. Once continuous operation was demonstrated, numerous shutdown scenarios were conducted that demonstrated a rapid recovery of system performance. Over time, the recovery time decreased as the microbial population became more established within the FBR system. The downstream equipment operated as designed, producing a plant effluent water with a dissolved oxygen concentration above 7.5 mg/l and a turbidity of less than 0.1 NTUs.

Various microbiological studies were conducted across the entire plant. The presence of pathogenic organisms neither existed in the feed water, nor was fostered at any point within the plant. This was observed for both the steady-state operation and after plant shutdown/recovery scenarios. For the nonpathogenic microorganisms is the system, a CT of 4 was required to provide the necessary disinfection. Analyses of disinfection byproduct formation potential for various plant operating scenarios resulted in no levels above State of California standards.

This demonstration highlighted the robustness of the FBR treatment process and the system's ability to be utilized in conjunction with a surface water treatment plant to produce potable water. Based on the results from this demonstration, the applicability of such a technology to remediate aquifers with both nitrate and perchlorate is practical and should provide substantial cost savings compared with other treatment technologies.

EXAMPLE 2

Drinking Water Logic Process Control Specification for FBR Perchlorate Treatment at the City of Rialto, Calif., Well No. 2

Introduction

This example provides a description of the plant process control logic including perchlorate level measurement and electron donor feed control logic for the FBR Perchlorate Treatment System for Well No. 2 at the City of Rialto Calif.

Process Modes of Operation

Logic operates differently in each of five distinct modes. These modes include: FBR SHUTDOWN MODE; FBR RECYCLE MODE; SYSTEM RECYCLE MODE; RUN START MODE; and, RUN MODE. The active operating mode is displayed on the human machine interface (HMI) display screens.

FBR Shutdown Mode

When power is turned on, the system shall be in FBR SHUTDOWN MODE. All devices shall be de-energized.

FBR Recycle Mode

FBR RECYCLE MODE occurs during system start-up (follows FBR SHUTDOWN MODE) or after an applicable alarm condition. During system start-up, to initiate FBR RECYCLE MODE, the following actions are taken by the operator: At HMI place Hand-Off-Auto (H-O-A) switch for FBR Fluidization Pump P-100 in AUTO position; Depress and hold START FBR RECYCLE pushbutton to initiate FBR RECYCLE MODE. During an applicable alarm condition all devices and equipment are de-energized except for FBR Fluidization Pump P-100. HMI switches shall indicate OFF status for other equipment and devices.

System Recycle Mode

SYSTEM RECYCLE MODE occurs during system start-up (follows FBR RECYCLE MODE) or after an applicable alarm. During system start-up, to initiate SYSTEM RECYCLE MODE, the following actions are taken by the operator: Confirm system is in FBR RECYCLE MODE (P-100 is running and FV-105 is open); Place Aeration Blower B-200 in AUTO; Place Filter Feed Pump P-210 in AUTO; Enable Trimite Filter Run (Clarifier Forward Flush and Mixed Media; Backwash Permissives are withdrawn when system is in SYSTEM RECYCLE MODE; Place Chemical Feed Pumps P-410, -420, and -430 in AUTO; and, Depress and hold START SYSTEM RECYCLE MODE pushbutton to initiate SYSTEM RECYCLE MODE. Once initiated, valves FV-142, FV-340 and FV-343 open, valves FCV-20, FV-303 and FV-346 remain closed.

Run Start Mode

RUN START MODE automatically occurs during system start-up after SYSTEM RECYCLE MODE is initiated or during system recovery after a autonomously corrected alarm condition. The following actions will be automatically initiated unless DISABLE RUN START pushbutton (maintained) is depressed: Valves FV-142, FV-340 and FV-343 close, valves FCV-20, FV-303 and FV-346 open.

Run Mode

RUN MODE is automatically initiated following RUN START MODE after the FBR effluent perchlorate level has been confirmed to be less than the LCL. The following actions are automatically initiated upon commencement of RUN MODE: Trimite Clarifier forward flush and Timite Mixed Media backwash permissives are enabled.

Control

Feed Control Valve FCV-20

FCV-105 is a characterized V-port ball valve with air open/fail close pneumatic actuator and I/P positioner. FCV-20 modulation is PID control with feedback from FIT-20. Provisions shall be on HMI for adjustment of FLOW SETPOINT (range: 0-100 gpm) and PID parameters.

Fluidization Pump P-100

Pump HMI controls include an HAND-OFF-AUTO selector. Pump operation is initiated by operator selection of the Auto position and pressing the START FBR RECYCLE push button on the HMI. The pump shall continue to operate while the START FBR RECYCLE button is held in, overriding the PSL-105 and PSH-105 pressure switch alarms.

Fluidization Valve FV-105

FV-105 is a pneumatically actuated butterfly valve with a spring to close, air to open actuator. On loss of air or power, or during an applicable alarm condition, FV-105 will close, stopping water from entering the FBR system. During normal startup of the pump the fluidization valve (FV-105) will only open after positive pressure is detected by closure of the associated pressure switch (PSL-105) contact and a run indication is received from P-100 pump motor starter auxiliary contact. If PSL-105 or PSH-105 occur system will automatically initiate FBR SHUTDOWN MODE.

Oxidation Reduction Potential (ORP)

Provisions are included for monitoring and indication of ORP at the HMI. Transmitter provides 4-20 mA signal (range: −1400 mV to +1400 mV) to PLC for indication at HMI.

Aeration Air Blowers B-200

Blower HMI controls include a HAND-OFF-AUTO selector. Blower operation is initiated by operator selection of the AUTO position and pressing the START SYSTEM RECYCLE MODE push button. The blower shall continue to operate while the START button is held in, overriding the PSL-200 pressure switch alarm. If PSL-200 detects a low blower discharge pressure, a control signal is provided to the PLC. The PLC then will shut down the blower and initiate FBR RECYCLE MODE.

Aeration Tank T-210 Level Control

Level controller LC-210 controls LCV-210 position in proportion to tank level based on the following operator set parameters: Maximum Flow LCV-210 Position (0-100%); Maximum Flow T-210 Level (0-170"); and, Minimum Flow T-210 Level (0-170"). When T-210 level is at or above the Maximum Flow T-210 Level, LCV-210 position is set at the Maximum Flow LCV-210 position. When T-210 level is at or below the Minimum Flow T-210 Level, LCV-210 position is set at the closed position. When T-210 level is between the Maximum Flow T-210 Level and the Minimum Flow T-210 Level, LCV-210 position is calculated by the PLC as follows:

$$\text{LCV-210 Position (\%)} = [(\text{Maximum Flow LCV-210 position}) \times ((\text{T-210 Level} - \text{Minimum Flow T-210 Level}) / (\text{Maximum Flow T-210 Level} - \text{Minimum Flow T-210 Level}))] \times 100$$

The PLC also accepts signals from the Trimite Filter. When the Trimite Filter issues a control signal requesting a clarifier flush, LCV-210 will initially close while the Trimite clarifier bed is air scoured. As the Trimite PLC progresses through the clarifier flush sequence, it will call for LCV-210 to open to a preset position (CLARIFIER FLUSH PRESET, range: 0%-100%) to hydraulically cleanse the clarifier bed. This is accomplished by latching of dry contact to indicate adjustment of LCV-210 position to CLARIFIER FLUSH PRESET position. The Trimite PLC will continue to control LCV-210 until step 6—rinse to waste is completed, at which point the control of LCV-210 will revert to LC-210 (see above).

If the level within T-210 reaches LAHH-210 position during a clarifier flush sequence, the flush cycle is terminated, and a FBR RECYCLE signal is issued. FBR RECYCLE MODE is also initiated if the level within T-210 reaches LALL-210 during a clarifier flush sequence. Clarifier forward flush permissive shall be withdrawn if level in T-210 reaches LAL-210.

Filter Feed Pump (P-210) Control

Pump HMI controls include a HAND-OFF-AUTO selector. Pump operation is initiated by operator selection of the AUTO position and pressing the START SYSTEM RECYCLE MODE pushbutton on the HMI. A recirculation line is provided from the Filter Feed Pump discharge to the top of the Aeration Tank to protect against operation below minimum pump flow conditions, permitting P-210 to operate continuously during Trimite filter flush and backwash cycles.

Trimite Filter

Operation

The Trimite Filter operations are supervised and controlled by a dedicated PLC supplied with the Trimite package. In normal operations, polymer and coagulant is injected into the process line from the chemical feed pumps P-440 and P-450. Flow enters the Clarifier influent header, located near the bottom of the Clarifier. The water flows up through the Clarifier bed, and flows over the trough weir and into the Mixed Media Filter. Water passes through the filter media into the Trimite Filter under-drain system, which carries filtered water out.

As solids accumulate within the Clarifier, the differential pressure across the Filter Clarifier bed will increase. When the bed inlet pressure increases to the pressure setpoint of PSH-310, a Clarifier Flush Cycle is initiated.

Clarifier Flush Cycle:
Step 1—Stop flow through the Trimite.
Step 2—Air scour—Air only, 2-4 minutes.
Step 3—Flush to waste, Air and influent flow, 3-4 minutes.
Step 4—Bed leveling—Air only, 30-45 seconds.
Step 5—Bed settle—No air or influent flow, 30-45 seconds.
Step 6—Rinse-to-waste—Influent flow only, 5-8 minutes.
Step 7—Return to service.

As solids accumulate within the Mixed Media Filter, the differential pressure across the Mixed Media bed will increase. When the bed discharge pressure decreases to the pressure setpoint of PSL-320, a backwash Cycle is initiated.

Filter Backwash Cycle:

Step 1—Stop flow through the Trimite. Effluent flow to the Filter Effluent Tank continues to drain down the filter to within 6" of media top surface. This step takes approximately 4 minutes, and is controlled by a low level switch LSL-310.

Step 2—Air for air-scour, combined with low rate backwash water, refills the filter to near lip of collection trough. This step takes approximately 8 minutes, and is controlled by a high level switch LSH-310.

Step 3—Stop the air flow, and allow the low rate backwash to continue. This step takes about 45 seconds, and purges any remaining air from the media.

Step 4—Increase backwash rate to its nominal rate. (about 3-5 minutes)

Step 5—Stop high rate backwash flow, unit goes into filter-to waste cycle.

Step 6—Filter-to-waste is at nominal unit service flow rate, about 5-10 minutes, and then return the Trimite Filter to service.

Control Signals

Several control signals pass between the FBR PLC and the Filter PLC. Control signals passing from the FBR PLC to the Trimite Filter PLC include the following: Clarifier Forward Flush Permissive: enables Trimite Filter clarifier flush sequence; Mixed Media Backwash Permissive: enables Trimite Filter Backwash sequence; Trimite Run Permissive: enables Trimite Filter to run (no feed or FBR shutdown); and, Total Feed Flow: system feed flow to filter.

Control Signals passing from the Trimite Filter PLC to the FBR PLC include the following: Clarifier Flush Signal: indicates that the Trimite Filter is initiating a Clarifier Flush sequence; Mixed Media Backwash Signal: indicates that the Trimite Filter is initiating a backwash sequence; Filter Online Signal: Indicates that the Trimite Filter has no alarms: Control LCV-210 Signal: indicates that Trimite Filter requires positioning of LCV-210 to CLARIFIER FLUSH PRESET position; Filter Effluent Turbidity Signal: for indication at System HMI; and, Filter Effluent High Turbidity Alarm: to FBR and PLC for indication.

Filter Support Equipment

The Filter Air Blower, B-310, the Filter Effluent Pump, P-320, Filter Backwash Pump, P-330, electric valves FV-305, -320, -330 and the Trimite Filter are directly controlled by the Trimite Filter PLC.

Filter Effluent Tank Level Control

The Filter Effluent Tank is the source of backwash water for the Mixed Media Filter. To ensure an adequate amount of water for the filter backwash cycle, the tank is equipped with level transmitter LIT-340 (range: 0" to 170" w.c.). When the level within the Filter Effluent Tank rises to the position of LSH-340, FV-303 will close and FV-340 will open. FV-303 allows filtered water to enter Filter Effluent Tank, and FV-340 directs the filtered water to flow to the granular activated carbon beds. When the level within T-340 falls 6" below LSH-340, FV-340 will close, and FV-303 will open. If the level with T-340 reaches LAHH-340 during a filter backwash, the backwash is terminated and FBR RECYCLE MODE is initiated.

Chemical Feeds

Nutrient Pump Control

The nutrient pump HMI controls shall include a HAND-OFF-AUTO selector switch. Provisions are included to manually adjust flow rate at HMI while in HAND position. The pump shall normally be automatically paced in proportion to the electron donor pump. When the nutrient flow rate falls to FAL-410, a FBR RECYCLE will be initiated.

Electron Donor Pump Control

The electron donor pump HMI controls shall include an HAND-OFF-AUTO selector switch. Provisions are included to manually adjust flow rate at HMI while in HAND position. The pump shall be automatically controlled in proportion to feed flow (FI-20), the nitrate concentration of the feed (AI-650A), the dissolved oxygen concentration of the feed water (manually entered), and the perchlorate concentration of the feed (AI-761). When the electron donor flow rate falls to FAL-430, FBR RECYCLE will be initiated.

pH FEED PUMP CONTROL

The pH pump HMI controls include an HAND-OFF-AUTO selector switch. Provisions are included to manually adjust flow rate at HMI while in HAND position. In AUTO position, PLC shall control pH pump output via a 4-20 mA signal using a PID algorithm. PID tuning parameters shall be operator adjustable via the HMI. pH transmitter AIT-105 shall indicate FBR pH (range: 0.0 to 14.0) and temperature.

Dionex Perchlorate Analyzer

The Dionex perchlorate analyzer consists of the following components: Dionex DX-800 Perchlorate Analyzer, Dionex Feed Pumps (P-6610, -620, -630), Dionex Filters (F-610, -620, -630), Dionex Multi-Port sampling valve (FCV-740), and Dionex Analyzer PC (Chromeleon Software). The Dionex Analyzer PC communicates with the FBR HMI via OPC (Open Connectivity). Information is transferred back and forth between the Dionex PC and the System HMI utilizing this standard.

The following list the information transferred between the System HMI and Dionex.

Sample Point: Directs which sample Dionex is to evaluate (ASCII string)

Feed: 20

FBR Effluent: 21

Filter Effluent: 39

Analyzer Command (integer): instructs Dionex

Start: 0—Begin analyzer sequence

Sequence End: 1—end current sequence at end of sequence

Sample End: 2—End current sequence at end of currently running sample

Abort: 3—abort current sequence immediately

Resume: 4—Restart systems in stand-by

Standby End of Sequence: 5—put analyzer into standby at end of sequence

Standby End of Sample: 6—Put analyzer into standby at end of sample

Standby: 7—Put analyzer into standby immediately

Analyzer State (integer): Current state of Dionex can be monitored at FRB HMI

Ready: 1—Analyzer ready to run

Running: 2—Analyzer running sequences

Standby: 3—All channels are in standby state. If standby methods were assigned, they are run or are being run Standard: 4—Running calibration sequence Validate: 5—Running check standard sequence Alarm Schedule: 6—Running alarm schedule Re-run: 8—re-running sample Running RBE Sequence: 9—Running result based event sequence Analyzer Process Value (floating point): Perchlorate concentration (µg/l) of current sample at Dionex analyzer. Reference Dionex OPC Literature for additional specific information regarding operation of the Dionex Analyzer and Chromeleon software.

In automatic operation the Dionex analyzer is controlled by the PLC. Normally, the FBR PLC will initiate samples from FBR Effluent, Feed, and Filter Effluent on a timed basis. The frequency Timer for FBR effluent sample (EFFtime) is entered at the HMI and ratios of Feed (FEEDratio) and Filter Effluent sample (FILTEREDratio) are entered in relation to occurrences of FBR Effluent samples. FBR Effluent samples shall not occur more frequent then a FBR Hydraulic Retention Time (HRTFBR) under normal operating conditions. Process time for the Dionex analyzer is about 30 minutes per sample (S), so subsequent samples cannot occur more frequently (PLC waits for ready confirmation from Dionex before next sample is authorized to begin).

Initiation of a Dionex perchlorate sample occurs as follows: 1. PLC confirms that Dionex state is Ready; 2. PLC sends sample point instruction to Dionex (Feed, FBR Effluent, Filter Effluent); 3. Start command is issued after 10 second delay (to allow for sample point instruction to register with Dionex); 4. Dionex state is monitored to indicate Running; 5. Dionex state is monitored to indicate Ready, at which time Sample Process Value is read from Dionex (Sample PV is only updated when Dionex state changes from Running to Ready)

Provisions are available for manual control of Dionex perchlorate analyzer through the HMI and override of Dionex (manually enter perchlorate level of feed.

Nitrate Analysis

Feed nitrate and FBR Effluent nitrate is monitored at Nitrate Analyzer AIT-650. Feed is monitored via sample probe AE-650A and FBR effluent is monitored via sample probe AE-650B. A 4-20 mA signal is provided for each respective sample. Provisions are included at HMI for override of feed nitrate (manually enter) for maintenance.

HMI Recording

Provisions are included for historical trending of pH, ORP, Feed Flow, P-410 stroke rate, P-430 stroke rate, Feed Nitrate, FBR Effluent Nitrate, Feed Perchlorate, FBR Effluent Perchlorate, Filter Effluent Turbidity, and Filter Effluent Perchlorate. Additionally, alarms date and time of occurrence are recorded. Provisions are available to transfer data to Microsoft Excel spreadsheet format.

Air Compressor

The duplex air compressor shall operate independently of the system PLC controls.

Granulated Activated Carbon System

There are no automated control signals being passed to or from these units.

Backwash Sump Control

Waste water from the Dionex analyzer, and air compressor condensate flows to the Analyzer Sump (T-640). The sump is fitted with a level switch and pump. When the liquid level with the sump rises, the Sump Pump P-640 will energize. After the sump level falls below the level switch position, the sump pump will de-energize. When the liquid level within the sump rises to LAH-641, alarm shall be indicated at HMI.

EXAMPLE 3

Dual Use Groundwater and Surface Water Treatment System

This is a prophetic example. Based on permitting requirements, FBR-treated water could be completely disinfected and provided for public distribution and consumption. Additionally, a separate surface water treatment system could be added.

From the effluent collection header of each FBR vessel described in Example 1, the treated water can be introduced into a surface water treatment plant. The water can be aerated in a post aeration vessel to 7.0 mg/L of oxygen. The water cn then be processed through two multimedia filters in parallel (using a separate adsorption clarifier and mixed media chamber) where solids are removed. The use of a certified coagulant and polymer may be necessary based on the solids content of the water. The multimedia filter can produce water that is less than 0.3 NTUs, thereby meeting surface water treatment regulations. An ultraviolet system for partial disinfection can be used. Residual chlorine may be required prior to distribution to the public.

Following FBR treatment, the first stage of surface water treatment equipment will consist of one post aeration vessel, aeration grid, and blowers that will be provided to increase the oxygen content of the anoxic water. The post-aeration vessel will be 14 feet in diameter and 22 feet tall, and constructed of welded 304 stainless steel to API-650. The vessel will contain an influent aeration system that includes aeration distributors. The aeration blower will be a rotary lobe positive displacement blower capable of 66 scfm at 12 psig.

After the post-aeration vessel, the next stage will consist of Two Siemens Trident Multimedia Filters operating in parallel and capable of each treating 500 gpm of forward flow. One filter feed pump, with inverter duty motor with variable frequency drive, rated for 1000 gpm at 15 feet of total discharge head (TDH) will be supplied. A complete chemical feed system for coagulant and polymer addition will also be included.

Coordinated operation between the FBR and Trident Filter will be programmed through the main programmable logic controller. Water from the multimedia filters will be delivered by gravity to a 45,000 gallon concrete filter effluent sump. This concrete filter effluent sump will provide clean multimedia filter backwash water via a submersible pump rated at 2500 gpm at 30 feet TDH. Backwash water from the multimedia filter will drain by gravity to a 45,000 gallon concrete dirty backwash sump. A submersible backwash pump, rated at 100 gpm at 50 feet TDH will supply solids-laden water to a solids separator tank for eventual disposal.

Forward feed from the filter effluent tank will proceed to an ultraviolet disinfection reactor provided by Calgon Trojan, Inc. The UV system will meet a three log reduction of *Cryptosporidium* using three medium pressure 4 kW lamps/unit. The system comes equipped with a programmable logic controller with touch-screen HMI and automatic cleaning system. From the UV system, the water will be ready for recharge or chlorination for distribution as potable water.

The present invention is not limited to the embodiments described and exemplified above, but is capable of variation and modification within the scope of the appended claims.

What is claimed:

1. A method for reducing the concentration of perchlorate in water, comprising:
   a. contacting water with biomass capable of degrading perchlorate in a reactor;
   b. adding electron donor or nutrients to the water in the reactor in an amount effective to facilitate the degradation of perchlorate in the water by the biomass;
   c. determining the concentration of perchlorate or nitrogen in the treated water; and,
   d. disabling the flow of water through the reactor if the concentration of perchlorate is at or higher than a minimum control limit for perchlorate but lower than a maximum control limit for perchlorate, or if the concentration of nitrogen is at or higher than a minimum control limit for nitrogen but lower than a maximum control limit for nitrogen; and, e. enabling the flow of water through the reactor if the concentration of perchlorate is lower than the minimum control limit for perchlorate or if the concentration of nitrogen is lower than the minimum control limit for nitrogen.

2. The method of claim 1, wherein the step of disabling the flow of water further comprises:
f. adding electron donor or nutrients to the water in the reactor in an amount effective to facilitate the degradation of perchlorate in the water by the biomass, or increasing the time the treated water is in contact with the biomass in the reactor;
g. re-determining the concentration of perchlorate or nitrogen in the treated water;
h. repeating steps f and g until the concentration of perchlorate is lower than the minimum control limit for perchlorate or until the concentration of nitrogen is lower than the minimum control limit for nitrogen; and,
i. enabling the flow of water through the reactor if the concentration of perchlorate is lower than the minimum control limit for perchlorate or if the concentration of nitrogen is lower than the minimum control limit for nitrogen.

3. The method of claim 1, wherein the step of adding electron donor comprises adding ethanol or acetic acid.

4. A method for reducing the concentration of perchlorate in water, comprising:
a. contacting water with biomass capable of degrading perchlorate in a reactor;
b. adding electron donor or nutrients to the water in the reactor in an amount effective to facilitate the degradation of perchlorate in the water by the biomass;
c. determining the concentration of perchlorate or nitrogen in the treated water;
d. adding a predetermined maximum concentration of electron donor to the water in the reactor if the concentration of nitrogen is higher than a maximum control limit for nitrogen or if the concentration of perchlorate is higher than a maximum control limit for perchlorate;
e. re-determining the concentration of perchlorate or nitrogen in the treated water;
f. repeating steps d and e if the concentration of nitrogen is higher than the maximum control limit for nitrogen or if the concentration of perchlorate is higher than the maximum control limit for perchlorate;
g. disabling the flow of water through the reactor if the concentration of nitrogen is higher than the minimum control limit for nitrogen but lower than the maximum control limit for nitrogen or if the concentration of perchlorate is higher than the minimum control limit for perchlorate but lower than the maximum control limit for perchlorate; and,
h. enabling the flow of water through the reactor if the concentration of nitrogen is lower than the minimum control limit for nitrogen or if the concentration of perchlorate is lower than the minimum control limit for perchlorate.

5. The method of claim 4, wherein the step of disabling the flow of water further comprises:
i. adding electron donor or nutrients to the water in the reactor in an amount effective to facilitate the degradation of perchlorate in the water by the biomass;
determining the concentration of nitrogen or perchlorate in the treated water;
k. repeating steps i and j until the concentration of nitrogen is lower than the minimum control limit for nitrogen; and,
l. enabling the flow of water through the reactor if the concentration of nitrogen is lower than the minimum control limit.

6. The method of claim 4, wherein the step of adding electron donor comprises adding ethanol or acetic acid.

* * * * *